United States Patent
Fujibayashi et al.

(10) Patent No.: US 7,577,812 B2
(45) Date of Patent: Aug. 18, 2009

(54) STORAGE CONTROLLING UNIT

(75) Inventors: Akira Fujibayashi, Sagamihara (JP); Hiroki Kanai, Odawara (JP)

(73) Assignee: Hitachi, Ltd., Tokyo (JP)

( * ) Notice: Subject to any disclaimer, the term of this patent is extended or adjusted under 35 U.S.C. 154(b) by 264 days.

(21) Appl. No.: 11/106,536

(22) Filed: Apr. 15, 2005

(65) Prior Publication Data

US 2006/0184760 A1 Aug. 17, 2006

(30) Foreign Application Priority Data

Feb. 14, 2005 (JP) ............................. 2005-036114

(51) Int. Cl.
G06F 12/00 (2006.01)
(52) U.S. Cl. .............................. 711/170; 714/7; 714/13
(58) Field of Classification Search .................. 711/170; 714/7, 13
See application file for complete search history.

(56) References Cited

U.S. PATENT DOCUMENTS

| | | | |
|---|---|---|---|
| 6,349,357 B1 * | 2/2002 | Chong, Jr. .................... 711/111 |
| 6,393,519 B1 * | 5/2002 | Fujimoto et al. ............ 711/113 |
| 7,035,972 B2 * | 4/2006 | Guha et al. .................. 711/114 |
| 7,043,665 B2 * | 5/2006 | Kern et al. ...................... 714/5 |
| 7,069,468 B1 * | 6/2006 | Olson et al. ..................... 714/7 |
| 7,181,578 B1 * | 2/2007 | Guha et al. .................. 711/154 |
| 2002/0032761 A1 * | 3/2002 | Aoyagi et al. ................ 709/223 |
| 2004/0128587 A1 * | 7/2004 | Kenchammana-Hosekote et al. .............. 714/43 |
| 2004/0148380 A1 * | 7/2004 | Meyer et al. ................. 709/223 |
| 2006/0041718 A1 * | 2/2006 | Ulrich et al. ................. 711/114 |
| 2006/0184760 A1 * | 8/2006 | Fujibayashi et al. ......... 711/170 |

FOREIGN PATENT DOCUMENTS

| JP | 2000010901 | 1/2000 |
| JP | 2005004791 | 1/2005 |

OTHER PUBLICATIONS

IEEE 100 The Authoritative Dictionary of IEEE Standards Terms $7^{th}$ ed., 2000, p. 672, mathematico-physical quantity to Maximum continuous operating voltage.*
EMC Symmetrix DMX Architecture, Defining the Next Generation in High-End Storage Systems, pp. 1-75, 2003, 2004.

* cited by examiner

Primary Examiner—Matt Kim
Assistant Examiner—John P Fishburn
(74) Attorney, Agent, or Firm—Brundidge & Stanger, P.C.

(57) ABSTRACT

Provided is a storage controller capable of changing a system configuration with scalability. A storage controller blade of the storage controller includes: interface units that each connect to one of a host computer and a disk device; a processor unit that controls a configuration of the storage controller and data access; a memory unit that stores a data cache and configuration information on the interface unit and the processor unit; and a mutual connection unit that connects the interface units, the processor unit, and the memory unit to one another. The processor unit recognizes a form of connection to another storage controller blade over the mutual network, and the connection path to another storage controller blade is set in the mutual connection unit based on the recognized form of connection.

14 Claims, 19 Drawing Sheets

| # | PART ID | SLOT ID | CONNECTION PORT ID | FUNCTION | MEMORY AMOUNT | OWN-CONNECTION PORT ID |
|---|---------|---------|--------------------|----------|---------------|------------------------|
| 0 | 0 | 0-0 | 1 | SW | — | 0 |
| 1 | 0 | 0-1 | 1 | SW | — | 1 |
| 2 | 3 | 0-2 | 1 | STORAGE CONTROLLER BLADE | 2048 | 0 |
| 3 | 3 | 0-3 | 1 | STORAGE CONTROLLER BLADE | 2048 | 1 |
| 4 | 0 | 0-0 | 3 | SW | — | 2 |
| 5 | 0 | 0-1 | 3 | SW | — | 3 |
| 6 | 3 | 0-2 | 3 | STORAGE CONTROLLER BLADE | 2048 | 2 |
| 7 | 3 | 0-3 | 3 | STORAGE CONTROLLER BLADE | 2048 | 3 |

DISCOVERY INFORMATION TABLE 700

*FIG.5*

| # | DESTINATION 801 | SLOT ID 802 | OWN-CONNECTION PORT ID 803 | INCOMING PORT ID 804 | RELAY PART ID 805 | OUTGOING PORT ID 806 | SOURCE PORT ID 807 |
|---|---|---|---|---|---|---|---|
| 0 | STORAGE CONTROLLER BLADE | 0-2 | 1 | 2 | 0 | 1 | 0 |
| 1 | STORAGE CONTROLLER BLADE | 0-3 | 3 | 2 | 0 | 1 | 2 |
| 2 | STORAGE CONTROLLER BLADE | 0-2 | 1 | 4 | 0 | 3 | 1 |
| 3 | STORAGE CONTROLLER BLADE | 0-3 | 3 | 4 | 0 | 3 | 3 |
| 4 | SW | 0-0 | 1 | - | - | - | 0 |
| 5 | SW | 0-1 | 1 | - | - | - | 1 |

ROUTING MANAGEMENT TABLE 800

*FIG.6*

STORAGE CONTROLLING UNIT

CLAIM OF PRIORITY

The present application claims priority from Japanese application P2005-036114 filed on Feb. 14, 2005, the content of which is hereby incorporated by reference into this application.

BACKGROUND OF THE INVENTION

This invention relates to a storage controller for storing data in one or plural disk devices, in particular, to a storage controller capable of changing a system configuration with scalability.

Each year sees an increase in digital data to be stored at a corporate, governmental, municipal, or even personal level, and an increase in need for a larger capacity of a storage system. There are also increasing numbers of users and hosts that access digital data. Herein, the hosts access the digital data by communicating with data input/output devices such as a monitoring camera image controller, various personal authentication devices, authentication management servers on the Internet, sensor systems used for a traffic information system, and the like.

To meet such demands, it is necessary to structure a storage system that has the larger storage capacity and can handle the increasing number of accesses. However, as the demands increase as described above, it is difficult to make future projections for expansion while narrowing and pinpointing its prediction range. Therefore, vendors who introduce a system build the initial system based on prediction on the scale of a "just-in-case" system (provided with more than enough margins even for unlikely events). In other words, vendors introduce devices having resources with a size larger than that for the current use, or devices to which systems and the resources can be easily added later.

As represented by a large-scale disk array system, a conventional storage system presupposes a large-scale system configuration, and includes basic components required when setting up the large-scale system configuration or equipments to be required in the future. Examples thereof include a power source, a battery, a back plane having a number of slots for a large-scale system configuration, a shared memory blade for the large-scale system configuration, and a network (switch) blade.

Vendors of storage systems provide a plurality of models. For example, the vendors provide three models including small-through small/medium-scale devices, small/medium-through medium/large-scale devices, and medium/large-through large-scale devices. An example thereof is disclosed in "Symmetrix DMX Architecture Production description Guide", EMC Corporation, browsed online on the Internet at <URL: http://www.emc.com/products/systems/pdf/C1011_emc_symm_dmx_pdg_ldv. pdf> in April 2004.

Immediately after the introduction of the storage system, the minimum necessary configuration may be sufficient for a customer. However, the large-scale system configuration becomes necessary when the future projections for expansion of the system are taken into account.

A user can decide the scale of the storage system to be initially introduced among the above models to reduce cost for initial introduction of the storage controller into a system when the user's future projections for expansion are within the range of scalability of the model. On the other hand, when desired expansion of the device exceeds the range of scalability of the model decided by the user, it becomes necessary to replace the entire device or purchase an additional device, which increases cost required therefor.

What is most desirable for a user is to realize cost commensurate with the scale (small scale or large scale) of a storage system and to be allowed to expand the scale thereof between the small- and large-scales. However, with the reduced cost, it is difficult to provide the storage system with a sufficient scalability required therefor.

Discussion will be made herein as to ensuring sufficient scalability in a prior-art storage array device. In this case, the storage controller of the storage array device needs to have in advance such a mechanism (for example, an enhancement interface; hereinafter, referred to as "enhancement function") as to allow addition of various devices. However, the storage array device has a serious demand for reduced cost, and when an enhancement mechanism is merely introduced into the storage array device, cost for initial introduction becomes relatively high for the user having no clear future projections for expansion.

This issue will be described in detail. As an example, consideration is given to the prior-art storage array device including the storage controller blade and switch connection blade with shared memory unit.

For example, in the small-scale system configuration, the storage array device includes four storage controller blades and two switch connection blades with a shared memory. In this case, the system scale of the device becomes quite smaller.

In contrast, a case is assumed where the device is changed from the small-scale into a large-scale system configuration. The large-scale system includes 16 storage controller blades and four switch connection blades with a shared memory. The device is mounted with connection among many blades depending on its scale.

The type of mounting the blades differs between the prior-art small-scale and large-scale systems, and the connection between the blades basically has no commonality. When the device is formed into a small size by using a small number of blades limiting the scalability of the system, the relationships between the blades do not match, which does not allow the enhancement into the large-scale system configuration.

Accordingly, even when the small-scale model is initially introduced, the initial introduction cost is invested in vain upon the transition to the large-scale system. In other words, the user needs to invest cost for purchasing a model having a scalability aiming at a large scale, or excess cost more than the above cost, from the beginning.

It is also effective for users and vendors who introduce a system to provide a device having a scale desired by a user at necessary, sufficient cost. However, this point of view is not taken into account in prior arts.

SUMMARY OF THE INVENTION

This invention has been made in view of the above-mentioned problems, and it is therefore an object of this invention to provide a storage controller with sufficient scalability.

In order to achieve the above objects, this invention provides a storage controller for controlling data access made between a host computer and a disk device, including one or more storage controller blades and a mutual network system that connects the storage controller blades to one another, in which the storage controller blade each includes: interface units that each connect to one of the host computer and the disk device; a processor unit that controls a configuration of the storage controller and the data access; a memory unit that stores a data cache and configuration information on the interface unit and the processor unit; and a mutual connection unit that connects the interface units, the processor unit, and the memory unit to one another, and connects to the storage controller blades. The processor unit recognizes a form of connection to another storage controller blade over the mutual network system, and the connection path to another storage controller blade is set in the mutual connection unit based on the recognized form of connection.

According to this invention, it is possible to provide a storage system capable of realizing more flexible scalability and lower cost and protecting user's investment to a maximum extent.

BRIEF DESCRIPTION OF THE DRAWINGS

FIG. 5 is an explanatory diagram showing an example of a discovery information table according to the first embodiment.

FIG. 6 is an explanatory diagram showing an example of a routing management table according to the first embodiment.

DETAILED DESCRIPTION OF THE PREFERRED EMBODIMENTS

Hereinafter, description will be made of an embodiment mode of this invention with reference to the drawings.

In the embodiment mode of this invention, a storage controller is configured by combining a plurality of storage controller blades. In addition, a storage system is configured by combining a plurality of storage controllers and a disk device group.

The storage system can have the system configuration changed according to a request from a user. For example, a system scale thereof can be expanded. In particular, it is possible to configure a storage system having a larger scale (higher performances) by installing additional storage controller blades.

Further provided is means for allowing system configuration information that has been used to be transferred upon upgrade. This realizes a storage system with maximum availability.

Hereinafter, detailed description will be made of embodiments of this invention.

First Embodiment

Figure 1:
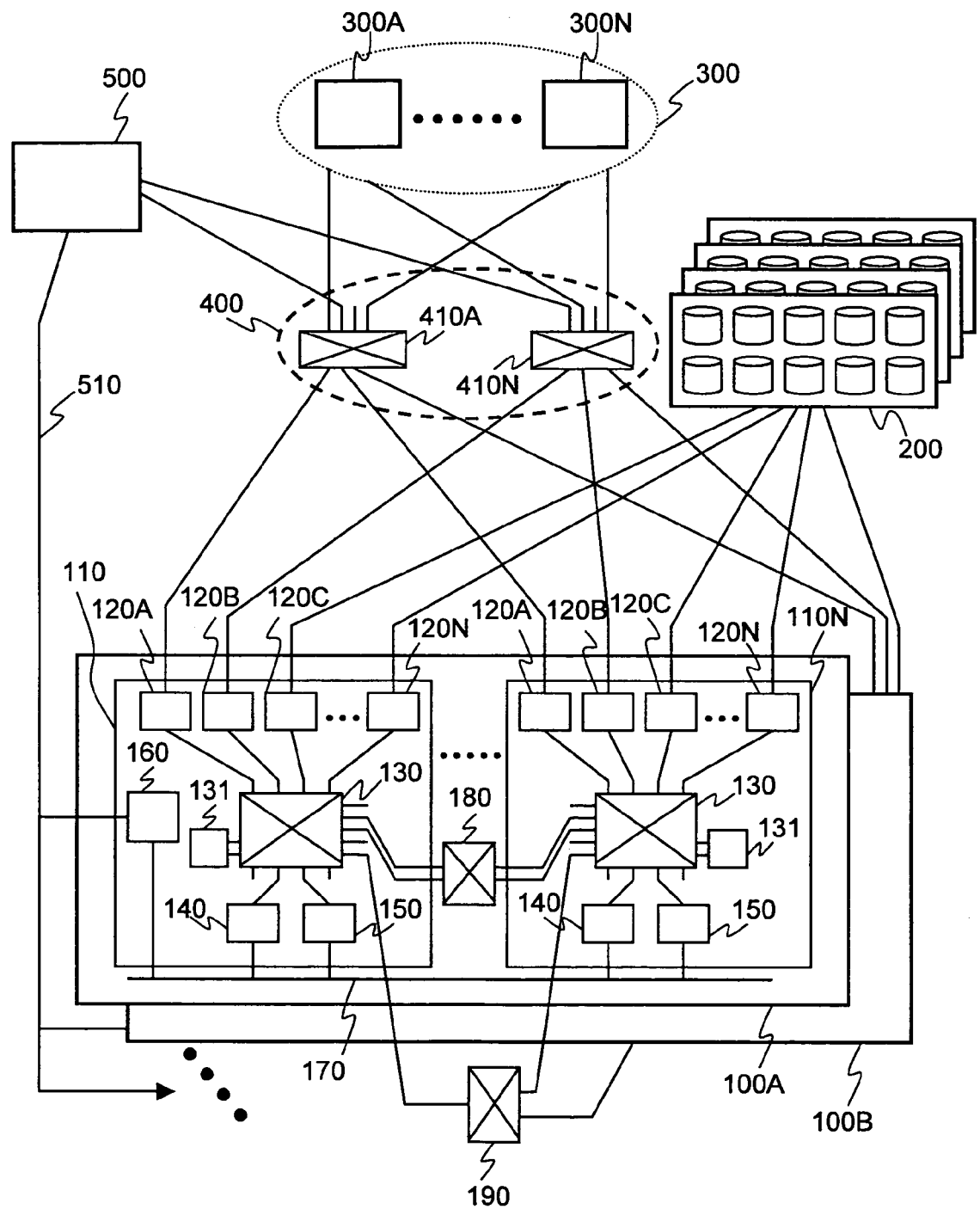
FIG. 1 is a block diagram showing a configuration of a computer system including a storage system according to a first embodiment of this invention.

FIG. 1 is a block diagram showing a configuration of a computer system including a storage system according to a first embodiment of this invention.

A storage system according to the first embodiment includes a storage controllers 100 (100A and 100B) and a disk device group 200. The storage controller 100 is connected to the disk device group 200. The storage controller 100 is also connected to a host group 300 and a management terminal 500 via a network 400.

The storage controller 100 may be used as a single controller or a plurality of controllers forming a redundant structure. In the example of FIG. 1, two storage controllers 100A and 100B are connected with each other via an inter-unit network 190, but three or more storage controllers forming a redundant structure may be used. The number of the storage controllers 100 is arbitrarily set, and increased or reduced depending upon the system scale demanded by a user.

The disk device group 200 includes one or more disk devices. The disk devices allocate a plurality of logical areas by forming a RAID array. The storage controller 100A writes data into each logical area thereof and reads out the data therefrom.

The disk device group 200 may include not only the disk devices forming the RAID array but also various storage controllers such as disk devices forming a Just-Bunch-of-Disks (JBOD) array, a disk array system, a tape library device, and a semiconductor disk device.

The storage controller 100 and the disk device group 200 are connected to each other via a protocol (for example, Fibre Channel) suitable for data transfer.

The storage controller 100 and the disk device group 200 may form a storage system independently. In this case, the storage controller 100 is connected to the host group 300 via a LAN. Alternatively, the storage controller 100 and the disk device group 200 may be connected to a Storage Area Network (SAN) via the network 400.

A minimum-scale configuration that functions as a storage system includes one storage controller 100 formed of two storage controller blades 110 and a mutual network 180. The storage system also includes a power source, a battery, and a casing frame. The minimum-scale configuration is compact to implement and thus low in cost for initial introduction.

The host group 300 includes one or more host computers 300A through 300N. The host computer 300A sends a request to the storage controller 100 and receives a reply thereto.

The network 400 is configured as a SAN and includes a plurality of SAN switches 410 (410A through 410N). The SAN switches 410 each connect the storage controller 100, the host group 300, and the management terminal 500 to one another. The network 400 may be configured as a network (for example, LAN) other than the SAN.

The storage controller 100 includes one or more storage controller blades 110. The storage controller blades 110 each handle access to the disk device group 200 based on a request from the host group 300.

The storage controller blade 110 includes one or more interface units 120 (120A through 120N), a switch unit 130, a buffer 131, a processor unit 140, and a memory unit 150.

In addition, the storage controller blades 110 are connected to each other via the mutual network 180.

The mutual network 180 may have a connection form using a device such as a switch or a bus-type hub, passive backplane with a point to point connection (that directory connects all blades) or may have a connection form using mesh connection (perfect mutual connection that directly connects all storage controller blades) via cables.

The mutual network 180 has a connection form provided with a necessary, sufficient bandwidth for data transfer corresponding to a system scale demanded by a user. For example, the mesh connection using a cable is adopted when a system is first installed, and in turn, a connection form using a switch connecting the storage controller blades to each other is adopted for expansion of a device scale. With such a change, cost can be reduced for installing a new device, and the device can be expanded more flexibly.

The interface units 120A through 120N are each connected to the network 400 or the disk device group 200. The interface units 120A through 120N function as channel interfaces to the host computers 300A and the like. The interface units 120A through 120N further function as storage interfaces to the disk device group 200. The number of the interface units 120A through 120N is arbitrarily set, and increased or reduced depending upon performances etc. demanded by a user.

The switch unit 130 connects the interface units 120, the processor unit 140, and the memory unit 150 to one another. The buffer 131 temporarily stores data transferred by the switch unit 130.

The processor unit 140 controls a function of each unit of the storage controller blade 110. Particularly in this embodiment, the processor unit 140 executes processing to recognize information on blades (storage controller blade and switch connection blade) connected to the storage controller blade 110. The number of processor units 140 is arbitrarily set, and increased or reduced depending upon performances demanded by a user.

The memory unit 150 includes a storage system such as a RAM.

Information stored in the memory unit 150 includes a storage controller configuration, control information, data input/output control information (for example, directory management information on cached data), a RAID structure of a disk device group, a logical volume structure, and a function set for the logical volume (for example, a copy pair or mirrored status between logical volumes).

The storage controller blade 110 includes an interface 160. The interface 160 is connected to the management terminal 500 via a network 510. The management terminal 500 communicates with the storage controller blade 110 via the interface 160, and can change settings of the storage controller 100 or obtain statuses thereof. In the example of FIG. 1, only one of the storage controller blades 110 of the storage controller 100 includes the interface 160, but a plurality of storage controller blades 110 may each include the interface 160. Further, the interface 160 may have any configuration that allows the management terminal 500 to communicate with the storage controller 100.

The processor unit 140, the memory unit 150, and the interface 160 are connected to another storage controller blade 110N via a communication network 170. The use of the communication network 170 allows, for example, a disk cache or a shared memory to be shared and processors to communicate each other.

In the above storage system, the numbers of the storage controllers 100 and the storage controller blade 110 are arbitrarily set, and increased or reduced depending upon the system scale demanded by a user.

Figure 2:
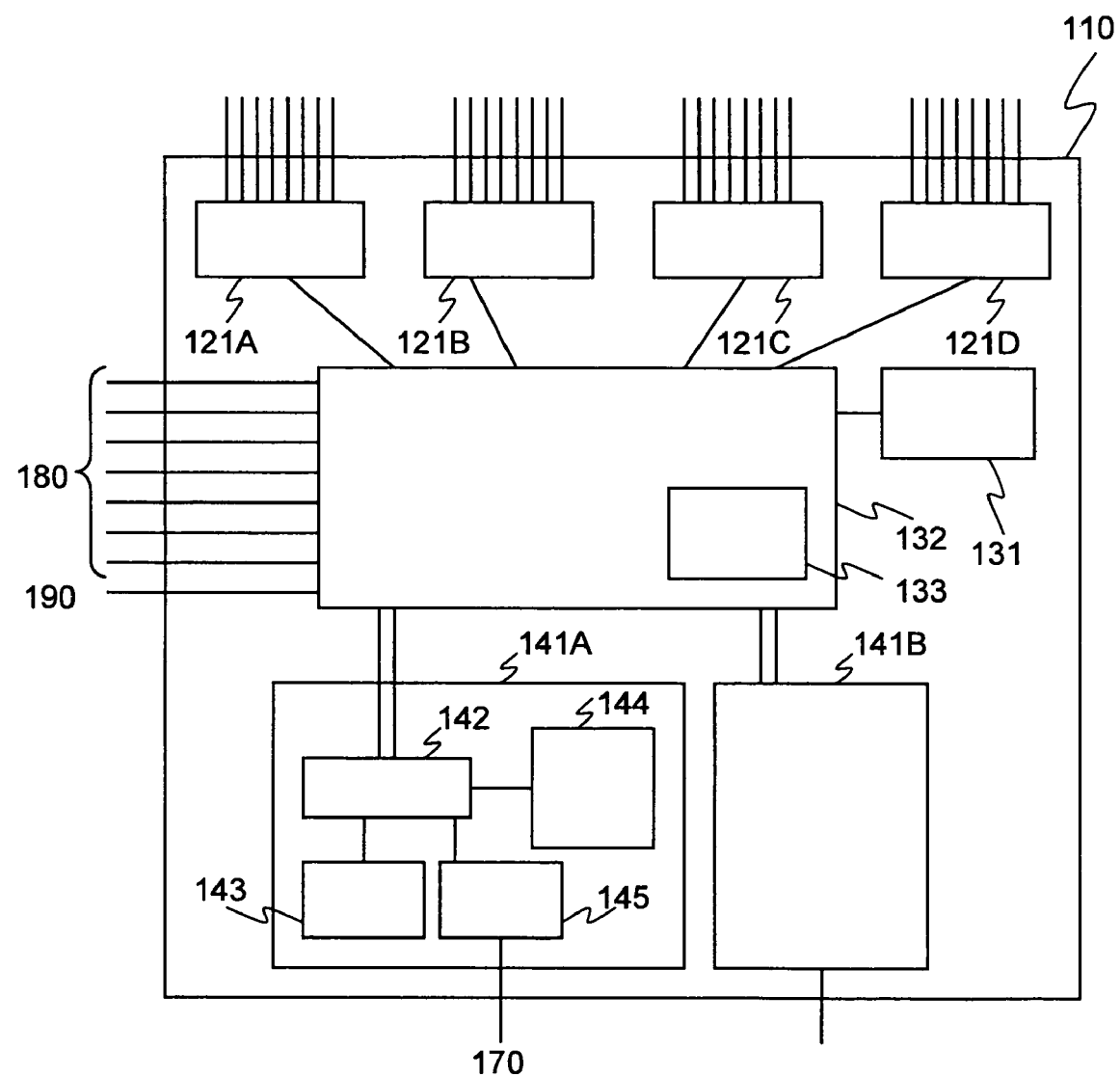
FIG. 2 is a block diagram showing a hardware configuration of a storage controller blade according to the first embodiment.

FIG. 2 is a block diagram showing a hardware configuration of the storage controller blade 110.

The storage controller blade 110 includes one or more interface control units 121 (121A through 121D), a switch mechanism 132, the buffer 131, and a plurality of processors 141 (141A and 141B). The switch mechanism 132 connects the other units with one another.

The interface control unit 121 includes a plurality of connection units that allows communications via a protocol suitable for data transfer. The connection units each function as the interface unit 120 by connecting to the disk device group 200 and to the host group 300 via the network 400.

The number of the interface control units 121 is arbitrarily set, and the number of the connection units provided to the interface control units 121 is also arbitrarily set.

The switch mechanism 132 connects the interface control units 121 to the processors 141. Also, the switch mechanism 132 is connected to a switch mechanism 132 provided to another storage controller blade 110 via the mutual network system 180. The switch mechanism 132 is further connected to a switch mechanism 132 provided to another storage controller 100 via the inter-unit network 190.

The switch mechanism 132 includes a mutual network interface control unit 133. The mutual network interface control unit 133 controls transfer of data sent from each unit connected thereto. This allows the switch mechanism 132 to function as the switch unit 130.

The switch mechanism 132 transfers data and configuration information sent to/received from each unit connected thereto, in other words, the interface control unit 121, the processor 141, or a switch mechanism 132 provided to another storage controller blade 110. The switch mechanism 132 transfers data between different protocols, and also transfers data between the same protocols.

The buffer 131 includes a Double Data Rate (DDR) memory (RAM), and temporarily stores data transferred by the switch mechanism 132.

The processor 141A includes a bridge 142, an MPU 143, a memory 144, and a LAN controller 145.

The bridge 142 connects the other units of the processor 141A with the switch mechanism 132, and transfers data among the other units of the processor 141A and between the other units of the processor 141A and the switch mechanism 132.

The memory 144 includes a RAM. The memory 144 stores data processed by the processor 141. The memory 144 also functions as a disk cache and a shared memory. The disk cache temporarily stores data read/written by the disk device group 200. The shared memory stores configuration information on the storage controller 100 and the disk device group 200. In other words, the memory 144 functions as the memory unit 150.

The MPU 143 controls the storage controller blade 110. In other words, the MPU 143 functions as the processor unit 140.

The LAN controller 145 communicates with the other processor 141B etc. via the communication network 170. The LAN controller 145 allows the processor 141A to communicate with the other processor 141B or a processor provided to another storage controller blade 110. This allows different storage controller blades 110 to share the cache and configuration information stored in the memory 144.

As described above regarding to the configuration of the processor 141A, the processor 141B has the same configuration.

Further, the configuration of the storage controller blade 110 as shown in FIG. 2 includes two processors 141, but more than two processors 141 may be adopted. By increasing the number of the processors 141, parallel processing can be enhanced to improve the processing speed and performances of the storage controller blade 110.

Next, description will be made of the storage controller 100.

Figure 3A:
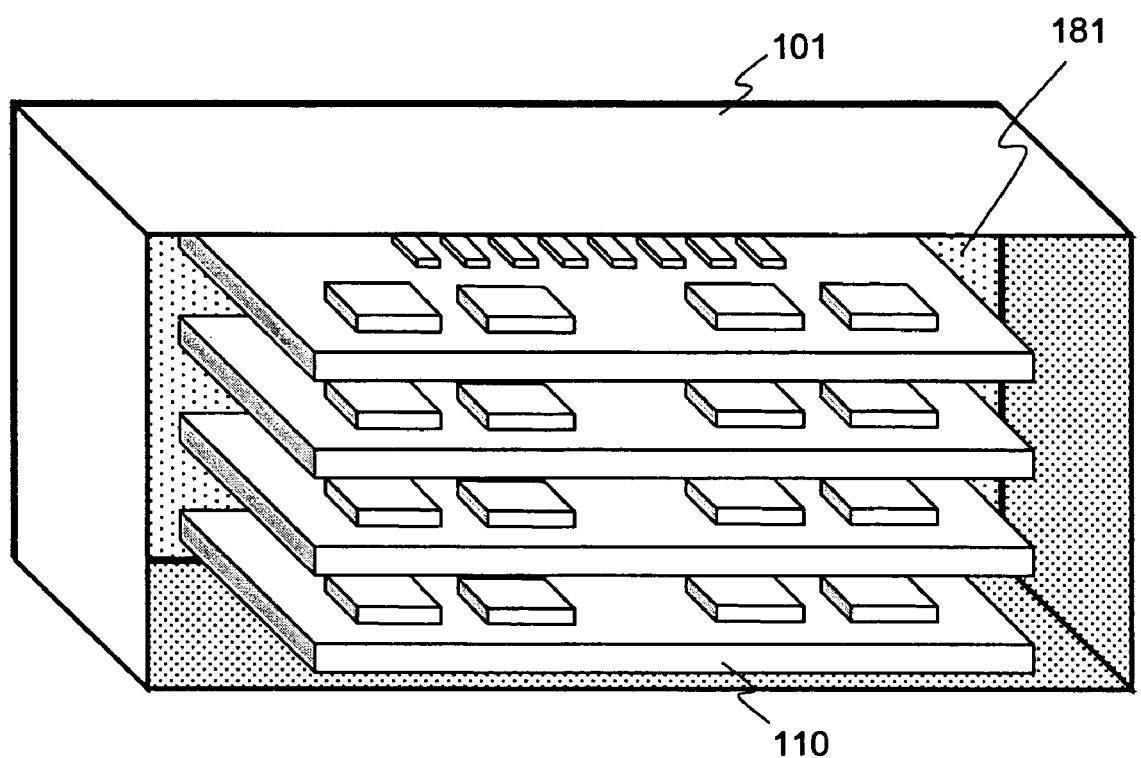
FIG. 3A is a perspective view of an example configuration of a storage controller configured into a small scale according to the first embodiment.
Figure 3B:
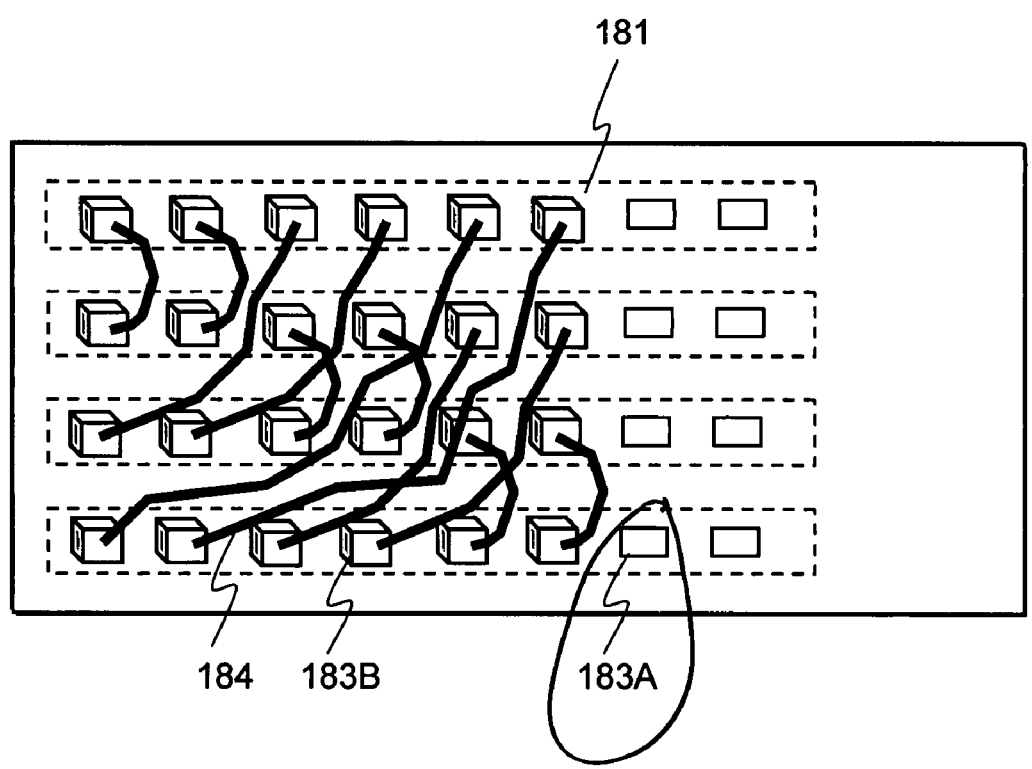
FIG. 3B shows a rear face of the example configuration of the storage controller configured into a small scale according to the first embodiment.

FIG. 3A is a perspective view of an example configuration of the storage controller 100 configured into a small scale, and FIG. 3B shows a rear face thereof. In FIGS. 3A and 3B, the disk device group 200, the power source, the battery, etc. are omitted.

As shown in FIG. 3A, the storage controller 100 includes four storage controller blades 110. The storage controller blades 110 are each connected to a back plane 181 and stored in a casing (blade storing unit) 101.

Further, as shown in FIG. 3B, the back plane 181 includes a connector 183A for connection between the storage controller blades 110. The connector 183A is connected to a connector 183B. The connector 183B is provided to both ends of a cable 184 that connects between the storage controller blades 110. A plurality of cables 184 are used to directly connect the storage controller blades 110 to one another on a one-to-one basis. In other words, each storage controller blade 110 is directly connected to all the other storage controller blades 110. Such connection is called a "full-mesh network".

The connector 183A is connected to the switch unit 130, processor unit 140, and memory unit 150 of each storage controller blade 110. Accordingly, the storage controller blades 110 are connected to one another via the cables 184, thereby forming the communication network 170 and the mutual network system 180.

The back plane 181 has no wirings for connecting the storage controller blades 110 with one another, and instead uses cables to communicably connect the storage controller blades 110 with one another.

It should be noted that the back plane 181 may be provided in advance with wirings having a conductor pattern that uses the above-mentioned full-mesh configuration to connect the storage controller blades 110 with one another.

By using the cables as described above, in the case where, for example, the storage controller blades 110 is changed in number, a change has only to be made in the connection using the cable 184. Therefore, particularly when configured into a small scale, the system can have the initial cost suppressed to a minimum with only a necessary configuration of the storage controller 100, and allows easy upgrade of its configuration.

Figure 4:
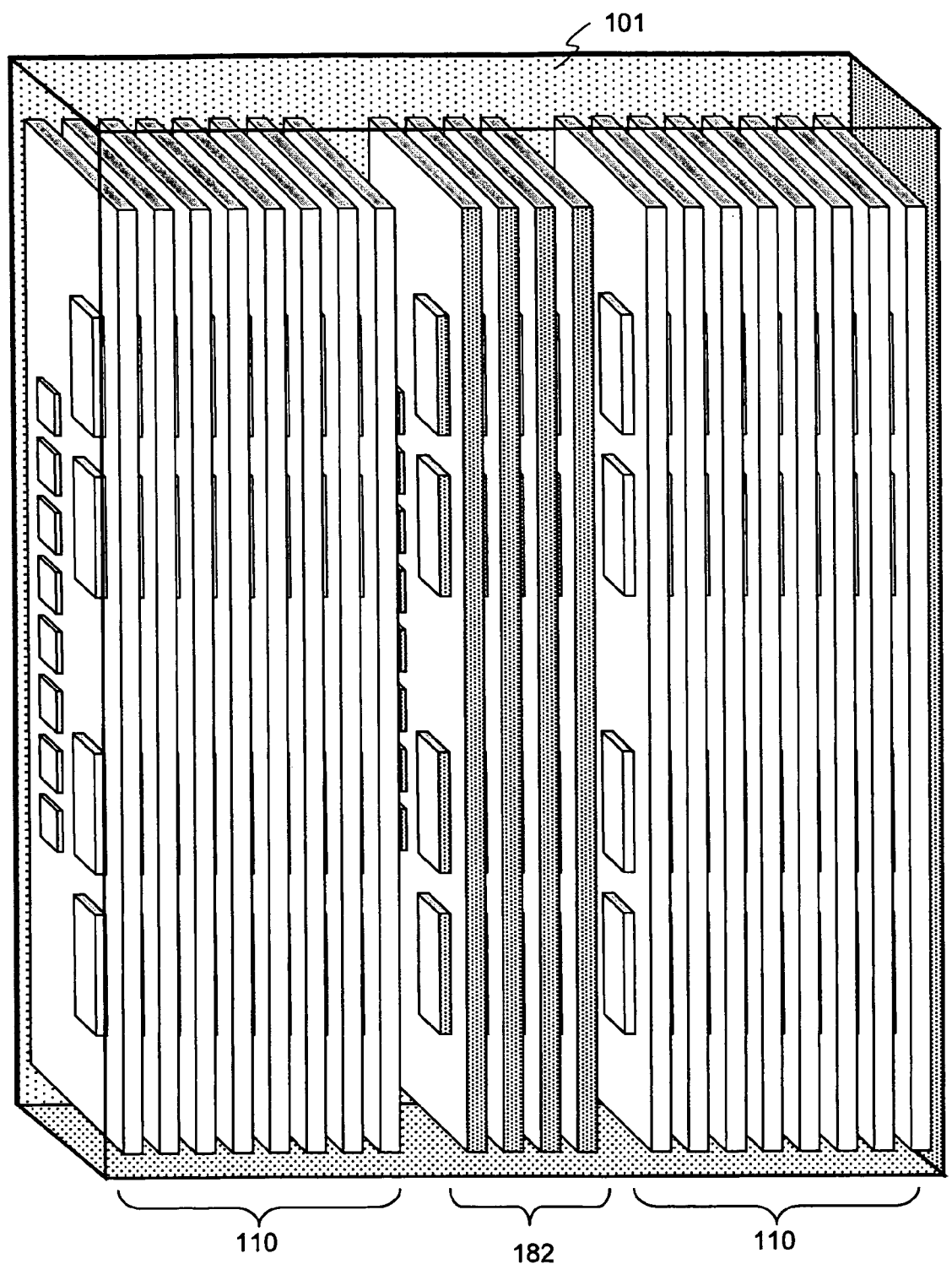
FIG. 4 is a perspective view of an example configuration of the storage controller configured into a large scale according to the first embodiment.

FIG. 4 is a perspective view of an example configuration of a storage controller configured into a large scale. In FIG. 4, the disk device group 200, the power source, the battery, etc. are omitted.

As shown in FIG. 4, the storage controller 100 includes 16 storage controller blades 110. The storage controller blades 110 are each connected to the back plane 181 and stored in the casing 101.

As described above in FIGS. 3A and 3B, in the case where the number of the storage controller blades 110 is small, the full-mesh configuration using cables is desirable to connect the storage controller blades 110 with one another.

However, since the example configuration includes the 16 storage controller blades 110, the number of cables becomes large, making it difficult to use the full-mesh configuration for implementation. Therefore, there is provided switch connection blades 182 for connecting the storage controller blades 110 to one another.

The switch connection blades 182 each include a switch that controls send/receive of data and configuration information among the storage controller blades 110. According to the above, the back plane 181 and the switch connection blades 182 are used to configure the mutual network system 180.

In the example of FIG. 4, unlike the examples of FIGS. 3A and 3B, the back plane 181 is provided in advance with wirings for connection between the storage controller blades 110 and the switch connection blades 182.

With such an arrangement, the configuration of the storage controller 100 can be changed without a large change in system configuration. Thus, system upgrade also needs only a minimum change in configuration. In other words, the cases can be handled where the number of the storage controller blades 110 is small as in the example of FIGS. 3A and 3B, and where the number is large as in the example of FIG. 4. To be specific, small-to large-scale systems can be handled by changing the mutual network system 180 (cable 184 or switch connection blade 182) without a change in the storage controller blades 110. This makes the cost optimum to each scale.

In addition to the switch that connects the storage controller blades 110 to one another, the switch connection blade 182 may be a switch connection blade with a memory unit. The memory unit stores information shared among the storage controller blades 110, and functions as, for example, a shared memory or a cache memory. The information stored in the switch connection blades 182 can be referenced and updated among the storage controller blades 110.

The shared information is thus centralized in the memory unit provided to a storage controller blade, which allows reduction in the capacity of the memory provided to the storage controller blade 110, and leads to reduction in the cost and installing space.

Herein, a memory blade may be provided instead of the switch connection blade 182 with a memory unit. The memory blade includes only a dedicated memory unit for storing configuration information and an interface.

The switch connection blade with a memory unit or the memory blade may play roles like as the memory unit 150 described before.

Further, to facilitate the system change in the storage controller 100, the storage controller blade 110 includes a discovery unit that recognizes information on another storage controller blade 110 connected thereto. In other words, the discovery unit recognizes a form of connection to another storage controller blade 110. The discovery unit is stored in the memory unit 150 as a program, and the processor 141 loads the program to implement the function of the discovery unit.

First, when starting up the storage controller 100 or changing its configuration, the discovery unit establishes a link between the storage controller blade 110 and another storage controller blade 110 connected through the mutual network system 180 (cable 184 or switch connection blade 182) or a switch (switch connection blade 182). After that, it is judged which of the other storage controller blade 110 and the switch connection blade 182 is connected to the own storage controller blade 110 under the established link. When the other storage controller blade 110 is connected thereto, it is recognized what kind of blade it is and which port number it is connected to. When the switch connection blade 182 is connected thereto, it is recognized which port number it is connected to.

The recognized information is stored in a discovery information table 700 as shown in FIG. 5. The storage controller blade 110 can reference the discovery information table 700 to distinguish whether the connection is made via the back plane 181 or the switch connection blade 182.

For example, when the connection is made via the switch connection blade 182 as shown in FIG. 4, the storage controller blade 110 inquires of the switch connection blade 182 what kind of storage controller blade 110 is connected to each port. After that, the processor unit 140 provided to each storage controller blade 110 recognizes all devices that are connected thereto, and then completes a routing management table 800 as shown in FIG. 6.

FIG. 5 is an explanatory diagram showing an example of the discovery information table 700.

The discovery information table 700 stores the information on another device (blade or the like) recognized through processing by the discovery unit. The discovery information table 700 is stored in the memory unit 150.

The discovery information table 700 includes a part ID 701, a slot ID 702, a connection port ID 703, a function 704, a memory amount 705, and an own-connection port ID 706.

The part ID 701 is an identifier of a type of a device concerned. The type includes the storage controller blade, the switch connection blade, and the switch connection blade with a memory unit.

The slot ID 702 is an identifier of a location of a slot of the mutual network system 180 in which the device concerned is inserted.

The connection port ID 703 is an identifier of a port of the device concerned connected to the own storage controller blade 110.

The function 704 is information representing a function of the recognized device. For example, when the device concerned is the switch connection blade 182, "SW" representing a switch is stored.

The memory amount 705 is information on a memory capacity of the memory unit 150 provided to the device concerned.

The own-connection port ID 706 is an identifier of a port of the own storage controller blade 110 through which the recognized device is connected.

According to the discovery information table 700, it is possible to manage the information on existence of all devices along a route that can be accessed by the storage controller blade 110.

FIG. 6 is an explanatory diagram showing an example of the routing management table 800.

The routing management table 800 includes information on which type of device having which ID is connected to which port of the own storage controller blade 110. The routing management table 800 is stored in the memory unit 150.

The routing management table 800 includes a destination 801, a slot ID 802, an own-connection port ID 803, an incoming port ID 804, a relay part ID 805, an outgoing port ID 806, and a source port ID 807.

The destination 801 is information representing the function of a device to be accessed.

The slot ID 802 is an identifier of a slot in which the device to be accessed is inserted.

The own-connection port ID 803 is an identifier of a port of the own storage controller blade 110 connected to the device to be accessed.

The incoming port ID 804, the relay part ID 805, and the outgoing port ID 806 are information on a device existing between the own storage controller blade 110 and the device to be accessed. The device existing in-between (for example, switch connection blade 182) relays access between the own storage controller blade 110 and the device to be accessed.

The incoming port ID 804 is an identifier of a port of the device existing in-between which is connected to the own storage controller blade 110. The relay part ID 805 is an identifier of the device existing in-between. The relay part ID 805 is common to the part ID 701 of the discovery information table 700. The outgoing port ID 806 is an identifier of a port of the device existing in-between which is connected to the device to be accessed.

When a plurality of devices are identified by the relay part ID 805, the same number of incoming port IDs 804, relay part IDs 805, and outgoing port IDs 806 are stored in the routing management table 800.

The source port ID 807 is an identifier of a port of the device to be accessed which is connected to the device existing in-between.

According to the routing management table 800, it is possible for the storage controller blade 110 to manage a route to the device to be accessed.

For example, as apparent from the example of FIG. 6, a storage controller blade with an entry number #0 is inserted in a slot with a slot ID "0-2". FIG. 6 further shows that a route for access to the storage controller blade extends from a port of the own storage controller blade with a port ID "1", via a port "2" of a switch connection blade represented by a relay part ID "0" and an outgoing port "1" of the switch connection blade, to a port of the storage controller blade with a port ID "0".

In particular, when the connection is made via the switch connection blade 182, the discovery unit obtains the information on which port of the switch connection blade 182 is used for the connection. The discovery unit further obtains the information on which port of the own storage controller blade is connected to which port of the switch connection blade 182 and which port of the other storage controller blade is connected to which port of the switch connection blade 182. Then, the obtained information is stored in the routing management table 800. According to the routing management table 800, even when the storage controller 100 has a configuration where a plurality of switch connection blades 182 are cascaded, the storage controller blade 110 can obtain the information on another blade.

When the mutual network system 180 is configured by using a switch, the processor unit 140 of each switch connection blade 182 sets in the corresponding switch unit 130 the routing management table 800 including an address or port ID after the discovery processing and after the establishment of the routing management table 800. Alternatively, packets including port-to-port routing information on the switch unit 130 (for example, information representing that a route extends via a port "0" and a port "3" of the part "1") may be used for the access. This can eliminate the need for setting the routing management table 800 in the switch unit 130. It should be noted that other methods may be used to set the routing management table 800.

Next, description will be made of how to change the configuration of the storage controller 100.

Figure 7:
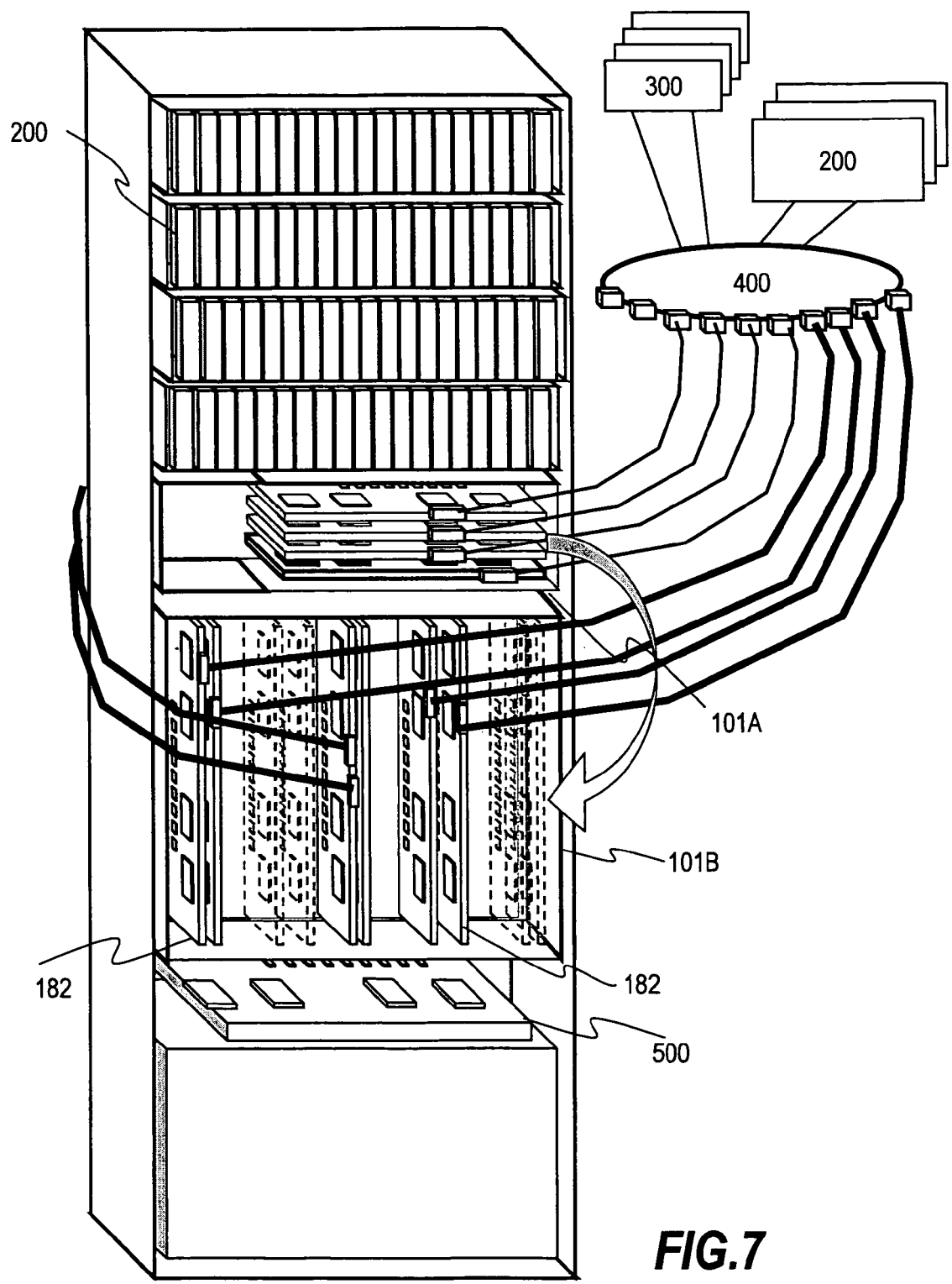
FIG. 7 is an explanatory diagram showing a change in configuration of the storage controller according to the first embodiment.

FIG. 7 is an explanatory diagram showing a change in configuration of the storage controller 100, and also shows how a system is upgraded from a small scale into a large scale.

A storage system of FIG. 7 includes disk storing units (disk device group 200), an old blade storing unit 101A that can store eight blades, a new blade storing unit 101B that can store 12 blades, and other components (a power source, a battery, the management terminal 500, and the like).

The old blade storing unit 101A stores four storage controller blades 110.

The new blade storing unit 101B stores another four storage controller blades 110 aside from the four stored in the old blade storing unit 101A, and two switch connection blades 182.

The storage controller blades 110 of the old blade storing unit 101A are in operation, and the storage controller blades 110 of the new blade storing unit 101B are not in operation yet.

The storage controller blades 110 stored in the old blade storing unit 101A are relocated to the new blade storing unit 101B in positions defined by dotted lines. Accordingly, the storage controller 100 that has undergone the change is now upgraded into a configuration having the eight storage controller blades 110 and the two switch connection blades 182 in total. After the upgrade, all the blades stored in the new blade storing unit 101B start to operate.

The management terminal 500 of the storage system is stored in a management terminal storing unit provided to a lower portion of the new blade storing unit 101B. To be specific, input/output devices (a keyboard and a display) are connected to an interface provided to the management terminal storing unit.

The power source and battery of the storage system are provided to a lower portion of the management terminal storing unit.

Figure 8:
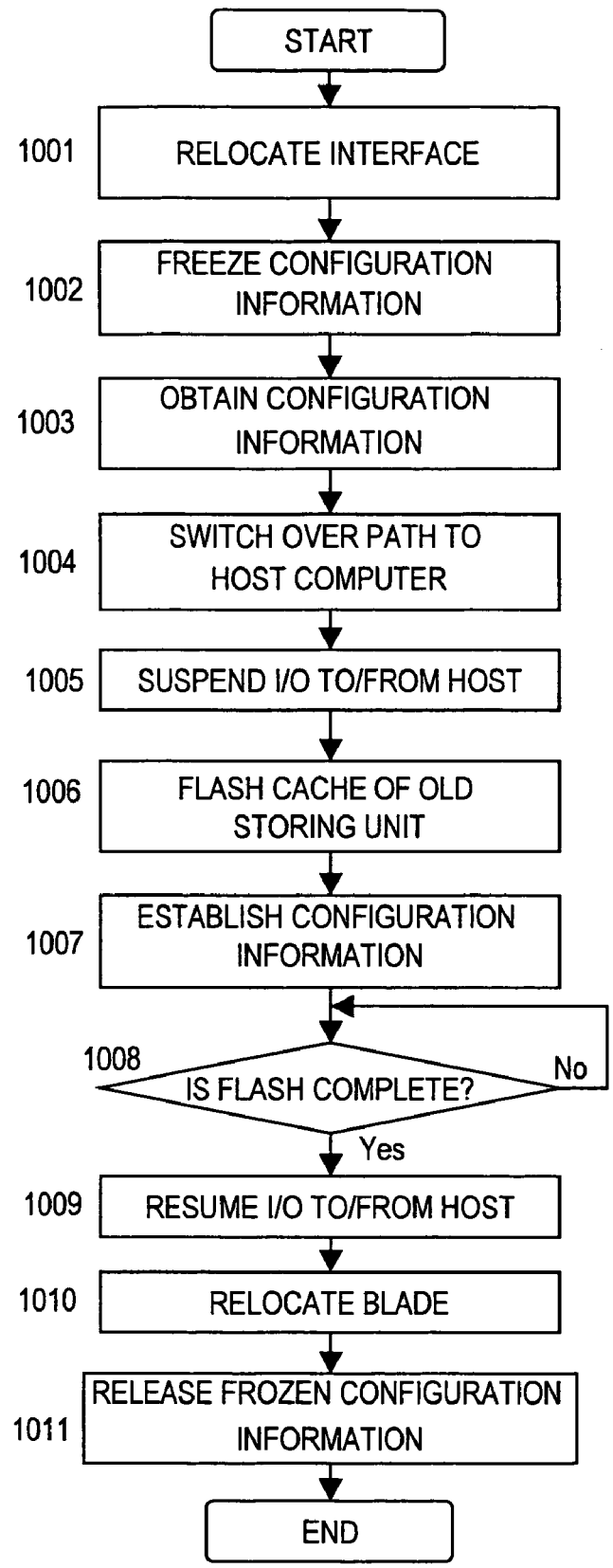
FIG. 8 is a flowchart of processing of changing the configuration of the storage controller according to the first embodiment.

FIG. 8 is a flowchart of processing of changing the configuration of the storage controller 100 according to the first embodiment.

In the processing for a configuration change, configuration information on the storage controller 100 that has not undergone the change (old blade storing unit 101A) is recorded in a particular logical volume of the disk device group 200 connected to the storage controller 100. Then, the configuration information is read out of the particular logical volume within the disk device group 200 to be reflected on the storage controller that has undergone the change (new blade storing unit 101B).

A given area dedicated as an area that stores the configuration information is previously allocated in a logical unit (logical volume) within the disk device group 200.

Alternatively, a partial area of a normal logical unit (logical volume) that stores data may be allocated to the dedicated area for storing the configuration information. For example, the configuration information (settings of a storage function, a license, a user account, etc.) on the entire device may be stored in the dedicated area secured in the logical unit, and the configuration information on a RAID array of the logical volume may be stored in the dedicated area allocated in the normal logical unit.

First, an administrator uses cables to connect the interface units 120 of the storage controller blades 110 stored in the old blade storing unit 101A and the interface units 120 of the storage controller blades 110 stored in the new blade storing unit 101B. The administrator also connects the interfaces 160 of the storage controller blades 110 stored in the new blade storing unit 101B with the management terminal 500 by use of cables. The administrator further connects the interface units 120 of the storage controller blades 110 stored in the new blade storing unit 101B with the network 400 by use of cables (step 1001).

This allows the host computers 300A etc. and the disk device group 200 to be shared by the storage controller blades 110 of the new blade storing unit 101B and the storage controller blades 110 of the old blade storing unit 101A. At this time, I/Os from/to the host computers 300A etc. are handled by the storage controller blades 110 of the old blade storing unit 101A. The storage controller blades 110 of the new blade storing unit 101B have not started its control operation yet.

Then, the storage controller blades 110 each freeze the configuration information on the storage system (step 1002). In other words, according to an instruction from the management terminal 500, a change is set to be inhibited in the configuration information on the storage controller 100 and the disk device group 200. The configuration information is stored in the memory unit 150 provided to each storage controller blade 110 of the old blade storing unit 101A.

Then, according to the instruction from the management terminal 500, each storage controller blade 110 of the old blade storing unit 101A stores the configuration information, which is stored in the memory unit 150 provided to the storage controller blade 110, in a dedicated area allocated in the disk device group 200. Then, the configuration information is obtained and stored in the memory unit 150 provided to each storage controller blade 110 of the new blade storing unit 101B (step 1003).

Then, according to the instruction from the management terminal 500, the storage controller blade 110 switches an access path from the host computer 300A over to the storage controller blade 110 of the new blade storing unit 101B (step 1004). In other words, a path management program of the host computer 300A is operated to switch a blade to be accessed by the host computer 300A from the storage controller blade 110 of the old blade storing unit 101A over to the storage controller blade 110 of the new blade storing unit 101B. To be specific, a destination (including a physical address of a target and a port number of a SAN switch) to be accessed by the host along the path is switched over.

Then, according to the instruction from the management terminal 500, the storage controller blade 110 suspends the I/Os from/to the host (step 1005).

Then, according to the instruction from the management terminal 500, the storage controller blade 110 of the old blade storing unit 101A has the cache data flashed (step 1006). In other words, data stored in the cache memory but not reflected on the disk is written into the disk device group 200.

Then, according to the instruction from the management terminal 500, the obtained configuration information is used to cause the storage controller blade 110 of the new blade storing unit 101B to recognize the configuration information, thereby establishing the configuration information (step 1007).

To be specific, the storage controller blade 110 of the new blade storing unit 101B is caused to recognize the configuration of the RAID array, and imports a logical volume. Further, a path to the host computer 300A is set. Accordingly, the storage controller blade 110 of the new blade storing unit 101B recognizes the disk device group 200 and the host computer 300A, and allows the processing by the storage controller 100.

The steps 1006 and 1007 are executed in parallel between the storage controller blades 110 of the old blade storing unit 101A and the storage controller blades 110 of the new blade storing unit 101B.

After that, the management terminal 500 judges whether or not the flash of all the cache data stored in the storage controller blades 110 of the old blade storing unit 101A has been completed (step 1008). When the flash is judged to have been completed, according to the instruction from the management terminal 500, the storage controller blades 110 of the new blade storing unit 101B each resume I/Os from/to the host (step 1009).

The above-mentioned processing enables the processing by the storage controller blade 110 of the new blade storing unit 101B. Meanwhile, the processing by the storage controller blades 110 of the old blade storing unit 101A has completely ended.

Then, the administrator relocates the storage controller blades 110 by removing the storage controller blades 110 from the old blade storing unit 101A, and storing them into the new blade storing unit 101B (step 1010). At this time, the cables used for the connection between the old blade storing unit 101A and the network 400 and the cables used for the connection between the old blade storing unit 101A and the new blade storing unit 101B are removed.

Then, according to the instruction from the management terminal 500, the storage controller blade 110 releases the frozen configuration information (step 1011). This allows the processing by all the storage controller blades 110 stored in the new blade storing unit 101B.

The above-mentioned processing makes it possible to change the configuration of the storage controller 100.

It should be noted that according to the flowchart, a time period during which the I/Os from/to the host cannot be handled occurs at the time of switching over the path to the host computer and at the time of relocating the storage controller blades 110. Therefore, the path management program stored in the host computer 300A may preferably used to reduce the time period during which the I/Os cannot be handled to a minimum.

As described above, according to the first embodiment of this invention, it is possible to change the configuration of the storage controller 100 with ease by increasing/decreasing the number of the storage controller blades 110. Particularly in the small-scale configuration, the storage controller blades 110 are connected to one another by use of the full-mesh configuration, while in the large-scale configuration, the switch connection blade 182 is used for the connection. With such an arrangement, the storage controller 100 can have the cost for initial introduction and the cost for upgrade suppressed to a lower level with the scalability being enhanced.

Second Embodiment

In the first embodiment described above, the configuration information is stored in the logical volume of the disk device group 200. In contrast, according to a second embodiment of this invention, the storage controller 100 includes a non-volatile storage device for storing the configuration information. Herein, the same constituents as those in the first embodiment are denoted by the same symbols, and their description will be omitted.

Figure 9:
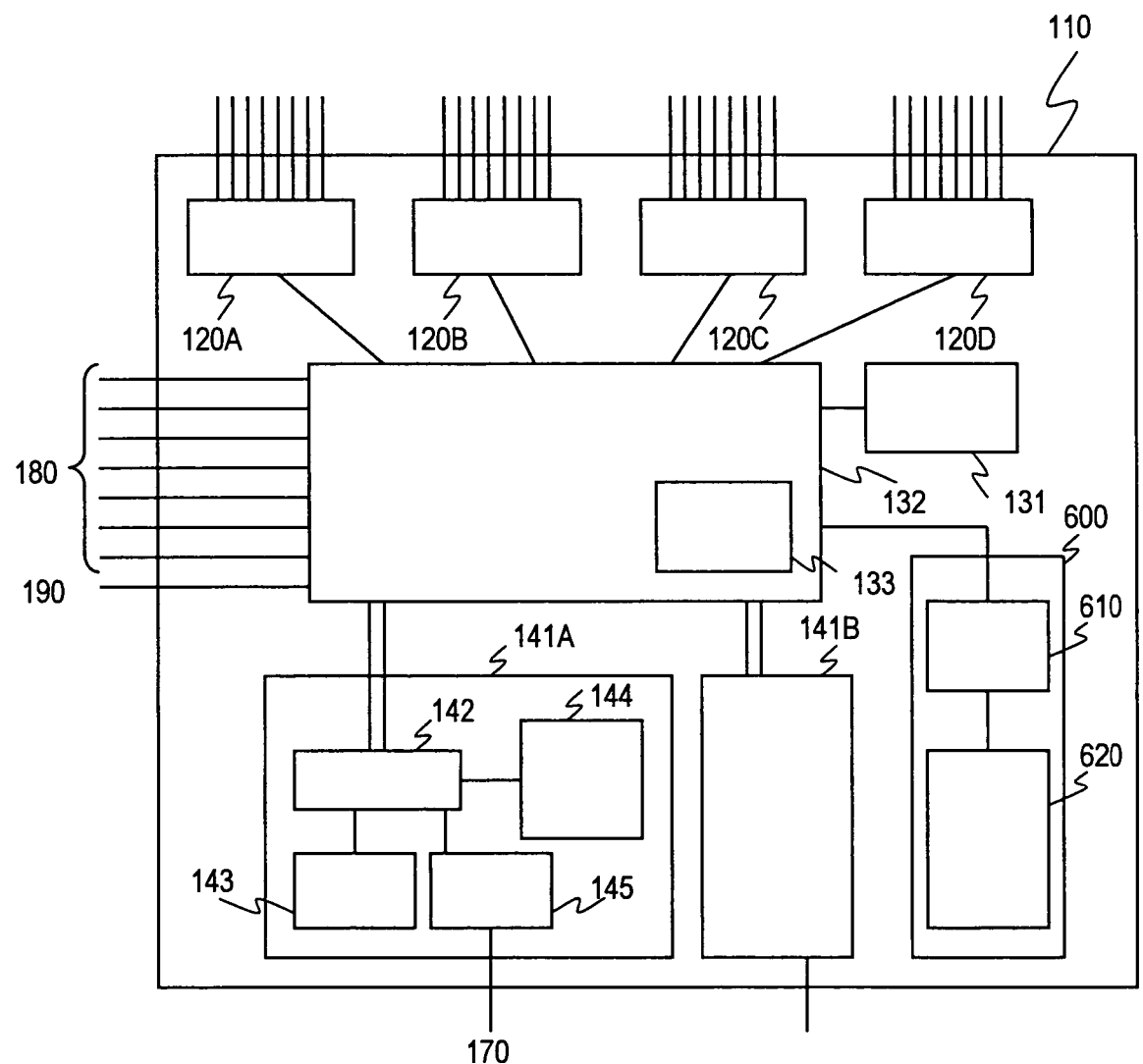
FIG. 9 is a block diagram showing a hardware configuration of a storage controller blade according to a second embodiment of this invention.

FIG. 9 is a block diagram showing a hardware configuration of the storage controller blade 110 according to the second embodiment.

The storage controller blade 110 according to the second embodiment includes a non-volatile storage device unit 600. The non-volatile storage device unit 600 is connected to the switch mechanism 132.

The non-volatile storage device unit 600 includes a non-volatile storage device control unit 610 and a non-volatile storage device 620.

The non-volatile storage device control unit 610 controls data to be read/written by the non-volatile storage device 620.

The non-volatile storage device 620 includes a recording medium such as a flash memory or a hard disk, and stores data under control of the non-volatile storage device control unit 610. The storage controller blade 110 stores the management information on the storage system in the non-volatile storage device 620.

The non-volatile storage device unit 600 described above is provided to the storage controller blade 110. With such an arrangement, the non-volatile storage device unit 600 can be managed for each storage controller blade 110, making it advantageous to manage the small-scale configuration having a small number of storage controller blades 110.

Figure 10:
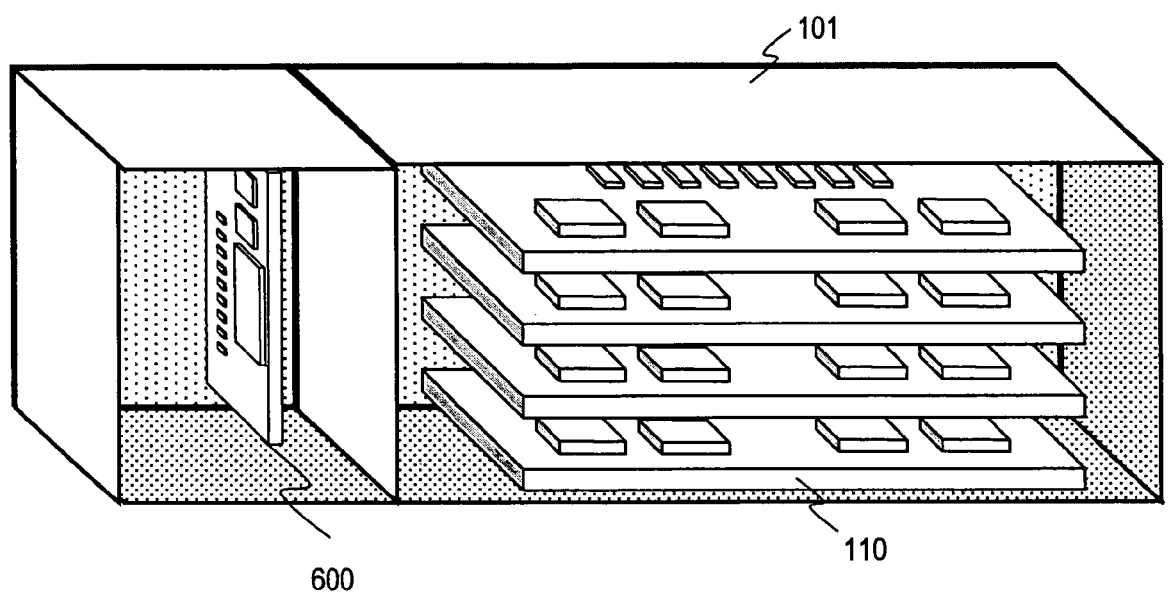
FIG. 10 is a perspective view of an example configuration of a storage controller according to the second embodiment.

Alternatively, as shown in FIG. 10, the non-volatile storage device unit 600 may be provided to an external portion of the storage controller blade 110.

FIG. 10 is a perspective view of an example configuration of the storage controller 100.

FIG. 10 shows four storage controller blades 110 similarly to FIG. 3A. The casing 101 includes the non-volatile storage device unit 600. The non-volatile storage device unit 600 is provided on a substrate different from the one with the storage controller blades 110. The non-volatile storage device unit 600 is connected to each of the storage controller blades 110 by use of the full-mesh configuration.

With such an arrangement, there is no need to manage the non-volatile storage device unit 600 for each storage controller blade 110, making it advantageous to manage the large-scale configuration having a large number of storage controller blades 110.

Alternatively, the non-volatile storage device unit 600 may be provided to an internal portion and the external portion of the storage controller blade 110. When the non-volatile storage device unit 600 is provided both the internal and external portions of the storage controller blade 110, the configuration information on the storage system can be transferred with ease. In particular, it is convenient to transfer the configuration information from the small-scale configuration to the large-scale configuration.

It is also possible to provide the non-volatile storage device unit 600 with a portable storage medium (such as a removable flash memory unit) to store the configuration information on the storage system into the portable storage medium. By moving the portable storage medium to another location, data can be transferred with much convenience.

Next, description will be made of a change in the configuration of storage controller 100 according to the second embodiment.

Figure 11:
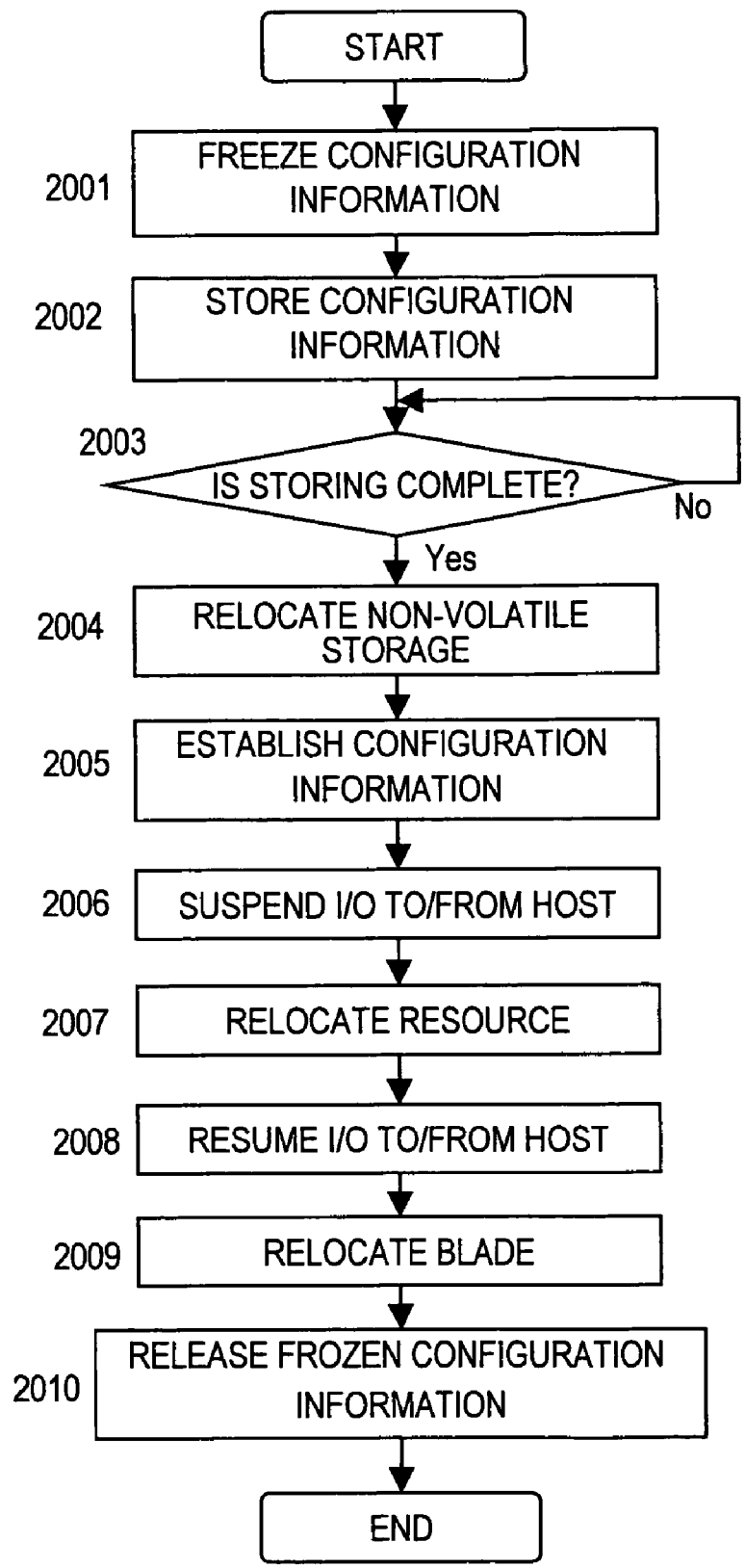
FIG. 11 is a flowchart of processing of changing the configuration of the storage controller according to the second embodiment.

FIG. 11 is a flowchart of processing of changing the configuration of the storage controller 100 according to the second embodiment. In the processing for a configuration change to be described with reference to FIG. 11, the configuration information on the storage system is stored in a storage area managed by the storage controller blade 110, and at the time of the processing for a configuration change, stored in the non-volatile storage device unit 600. The storage area for the configuration information on the storage system used by the storage controller blade 110 during operation may be allocated in a non-volatile storage medium or a volatile storage medium.

FIG. 11 shows how the storage controller 100 is upgraded from a small scale into a large scale similarly to FIG. 7.

First, the storage controller blades 110 each freeze the configuration information on the storage system (step 2001). In other words, according to an instruction from the management terminal 500, a change is set to be inhibited in the configuration information on the storage controller 100 and the disk device group 200.

Then, according to the instruction from the management terminal 500, each storage controller blade 110 of the old blade storing unit 101A stores the configuration information used by itself, into the non-volatile storage device unit 600 (step 2002).

Then, the management terminal 500 judges whether or not the step of storing the configuration information into the non-volatile storage device unit 600 is complete (step 2003). When judged that the storing step is complete, the administrator relocates the non-volatile storage device unit 600 between the storage controller blades 110 by removing the non-volatile storage device unit 600 from the old blade storing unit 101A, and storing it into the new blade storing unit 101B (step 2004).

Then, according to the instruction from the management terminal 500, the configuration information stored in the non-volatile storage device unit 600 is used to cause the storage controller blade 110 of the new blade storing unit 101B to recognize the configuration information, thereby establishing the configuration information (step 2005).

To be specific, the storage controller blade 110 of the new blade storing unit 101B is caused to recognize the configuration of the RAID array, and imports a logical volume. Further, a path to the host computer 300A is set. Accordingly, the storage controller blade 110 of the new blade storing unit 101B recognizes the disk device group 200 and the host computer 300A, and allows the processing by the storage controller 100.

Then, according to the instruction from the management terminal 500, the storage controller blade 110 suspends the I/Os from/to the host (step 2006).

Then, the resources are relocated (step 2007). To be specific, the storage controller blade 110 causes the path management program of the host computer 300A to operate, and switches the blade to be accessed from the host computer 300A over to the storage controller blade 110 of the new blade storing unit 101B. Further, according to the instruction from the management terminal 500, the storage controller blade 110 of the old blade storing unit 101A has the cache data flashed. Further, according to the instruction from the management terminal 500, the storage controller blade 110 uses the configuration information to define a logical volume and a logical path.

After the processing of the step 2007 is complete, according to the instruction from the management terminal 500, the storage controller blades 110 of the new blade storing unit 101B each resume I/Os from/to the host (step 2008).

Then, the administrator relocates the storage controller blades 110 by removing the storage controller blades 110 from the old blade storing unit 101A, and storing them into the new blade storing unit 101B (step 2009). The processing of the step 2009 is the same as that of the step 1010 of FIG. 8 as described above.

Then, according to the instruction from the management terminal 500, the storage controller blade 110 releases the frozen configuration information (step 2010). This allows the processing by all the storage controller blades 110 stored in the new blade storing unit 101B.

The above-mentioned processing makes it possible to change the configuration of the storage controller 100.

Figure 12:
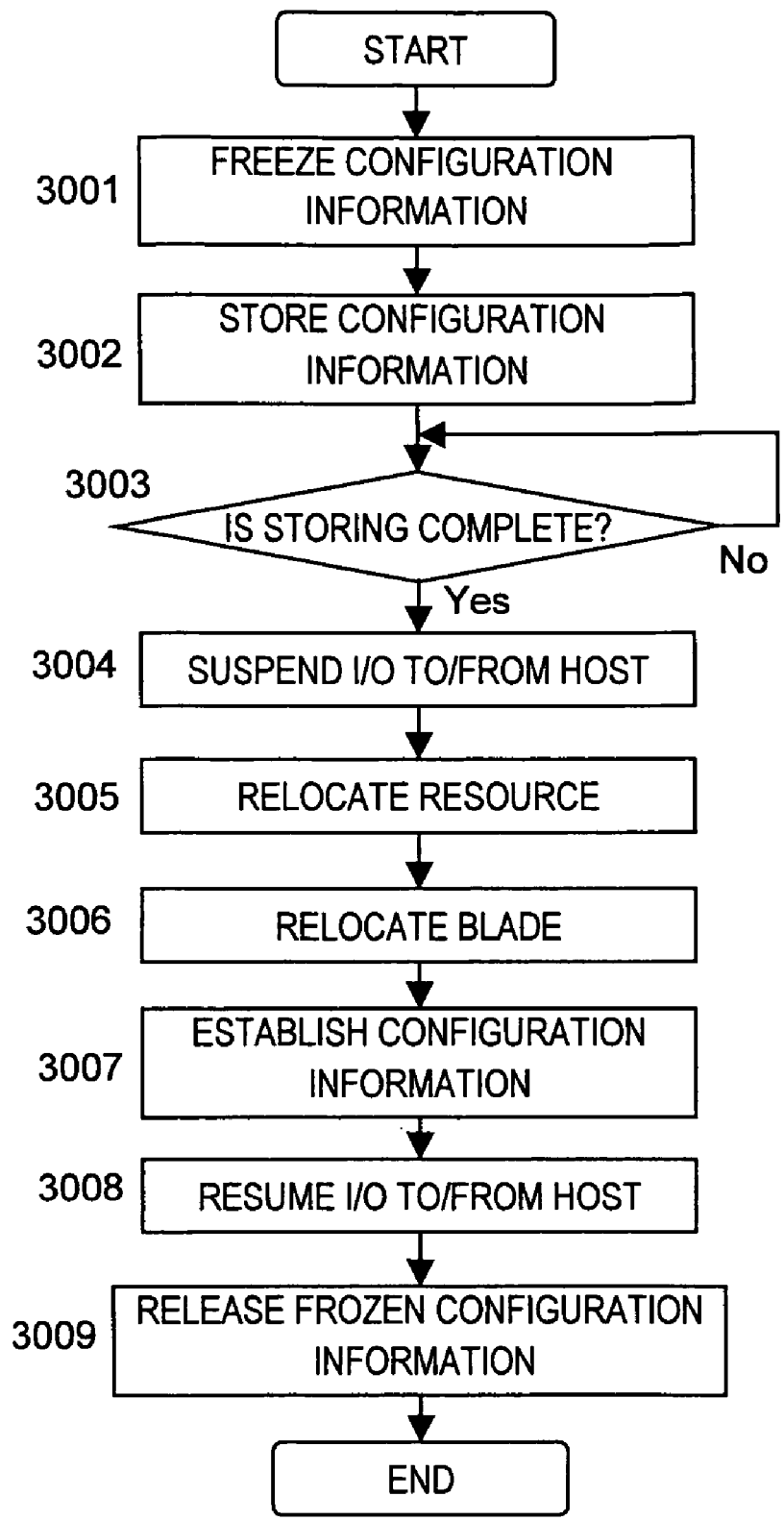
FIG. 12 is a flowchart of processing of changing the configuration of the storage controller according to a modified example of the second embodiment.

FIG. 12 is a flowchart of processing of changing the configuration of the storage controller 100 according to a modified example of the second embodiment.

In the processing shown in FIG. 11, the configuration information on the storage controller blade 110 of the new blade storing unit 101B is first established, and then the I/Os from/to the host computers 300A etc. are suspended, followed by the relocation of the resources. In contrast, in the processing shown in FIG. 12, the I/Os from/to the host computers 300A etc. are first suspended, and then the resources are relocated, followed by the establishment of the configuration information.

First, the storage controller blades 110 each freeze the configuration information on the storage system (step 3001). In other words, according to an instruction from the management terminal 500, a change is set to be inhibited in the configuration information on the storage controller 100 and the disk device group 200.

Then, according to the instruction from the management terminal 500, each storage controller blade 110 of the old blade storing unit 101A stores the configuration information used by itself, into the non-volatile storage device unit 600 (step 3002).

Then, the management terminal 500 judges whether or not the step of storing the configuration information into the non-volatile storage device unit 600 is complete (step 3003). When judged that the storing step is complete, according to the instruction from the management terminal 500, the storage controller blade 110 suspends the I/Os from/to the host (step 3004).

Then, the resources are relocated (step 3005). To be specific, the storage controller blade 110 causes the path management program of the host computer 300A to operate, and switches the blade to be accessed from the host computer 300A over to the storage controller blade 110 of the new blade storing unit 101B. Further, according to the instruction from the management terminal 500, the storage controller blade 110 of the old blade storing unit 101A has the cache data flashed.

Then, the administrator relocates the storage controller blades 110 by removing the storage controller blades 110 from the old blade storing unit 101A, and storing them into the new blade storing unit 101B (step 3006). The processing of the step 3006 is the same as that of the step 1010 of FIG. 8 as described above.

Then, according to the instruction from the management terminal 500, the configuration information stored in the non-volatile storage device unit 600 is used to cause the storage controller blade 110 of the new blade storing unit 101B to recognize the configuration information, thereby establishing the configuration information. Then, the configuration information is used to define a logical volume and a logical path (step 3007).

After all the processing of the step 3007 are complete, according to the instruction from the management terminal 500, the storage controller blades 110 of the new blade storing unit 101B each resume I/Os from/to the host (step 3008).

Then, according to the instruction from the management terminal 500, the storage controller blade 110 releases the frozen configuration information (step 3009). This allows the processing by all the storage controller blades 110 stored in the new blade storing unit 101B.

The above-mentioned processing makes it possible to change the configuration of the storage controller 100.

According to the method described above in FIG. 11, the time period for suspension of the I/Os can be reduced. In contrast, according to the method of FIG. 12, the change in configuration is performed after the suspension of the I/Os, the time period for suspension of the I/Os becomes longer, but the operation efficiency is enhanced. Therefore, the latter method may be used for the system in which the suspension of the I/Os are allowed for a long time period.

As described above, according to the second embodiment, the non-volatile storage device unit 600 is provided, so it is possible to change the configuration of the storage controller 100 more easily.

It should be noted that the non-volatile storage device unit 600 may store the configuration information (or its differentials) changed during the change in configuration.

To be specific, the storage controller blade is relocated without freezing the configuration information. Then, all the configuration information changed during the period are stored in the non-volatile storage device unit 600. After completion of relocation, the configuration information that have been changed are stored in the storage controller blade 110, followed by the establishment of the configuration information.

The above-mentioned arrangement makes it possible to change the configuration of the storage controller without freezing the configuration information.

Third Embodiment

Next, description will be made of a third embodiment of this invention.

In the third embodiment, another storage controller 100 having the same configuration as the existing storage controller 100 is added. At this time, another disk device group 200 having the same configuration as the existing disk device group 200 is also added. In other words, another system different from that including the storage controller blade 110 of the old blade storing unit 101A is built to include the storage controller blade 110 of the new blade storing unit 101B.

As a result, the storage system composed of the storage controllers 100 and the disk device group 200 can be changed into a redundant structure. Herein, the same constituents as those in the first embodiment are denoted by the same symbols, and their description will be omitted.

Figure 13:
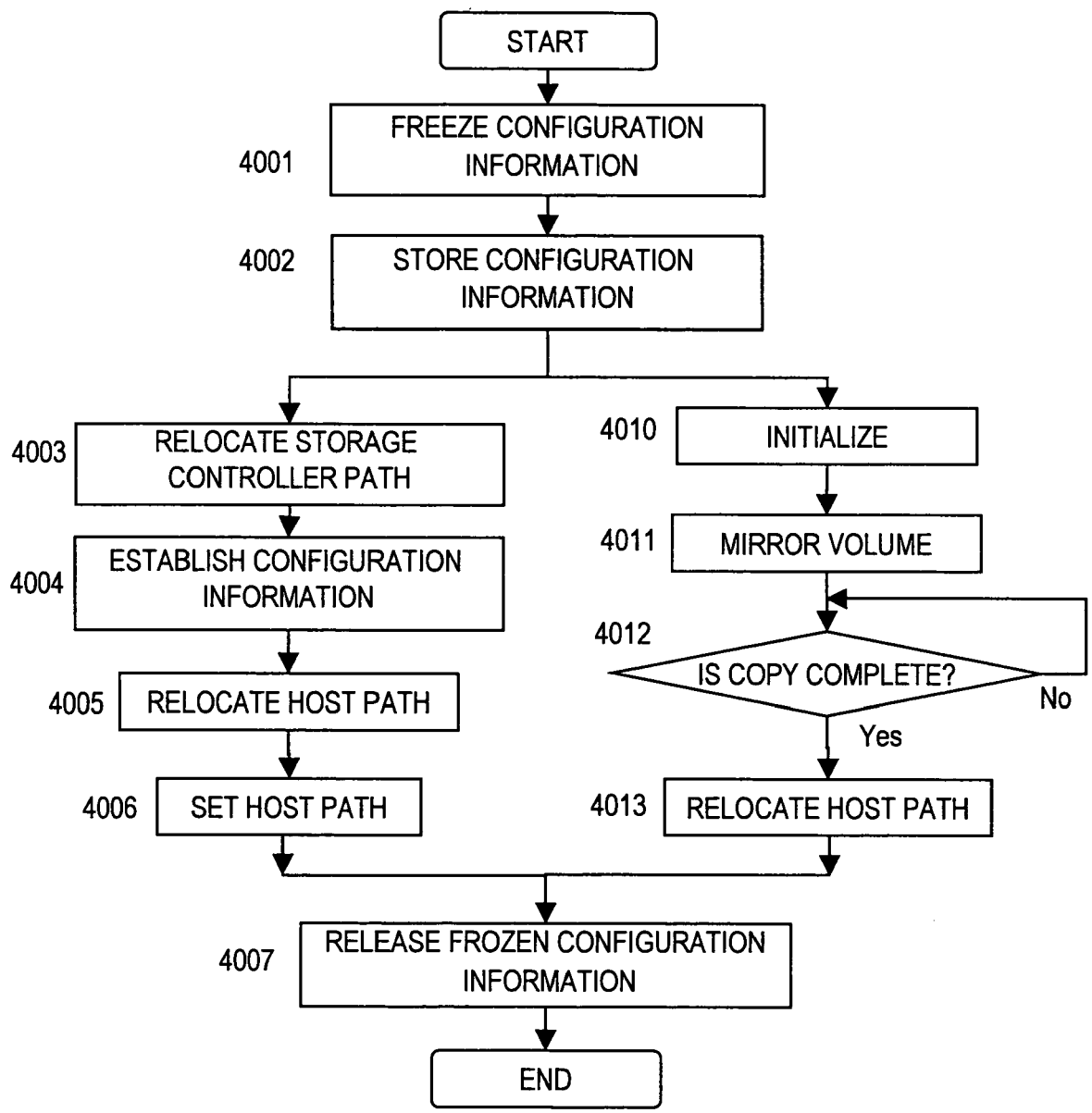
FIG. 13 is a flowchart of processing of changing a configuration of a storage controller according to a third embodiment.

FIG. 13 is a flowchart of processing of changing a configuration of the storage controller 100 according to the third embodiment.

First, the storage controller blades 110 each freeze the configuration information on the storage system (step 4001). In other words, according to an instruction from the management terminal 500, a change is set to be inhibited in the configuration information on the storage controller 100 and the disk device group 200.

Then, according to the instruction from the management terminal 500, each storage controller blade 110 of the old blade storing unit 101A stores the configuration information, which is stored in the memory unit 150 provided to the storage controller blade 110, into the memory unit 150 provided to the storage controller blade 110 of the new blade storing unit 101B (step 4002).

After that, a first processing and a second processing progress simultaneously. The first processing includes steps 4003 through 4006, which are executed in the storage controller 100. The second processing includes steps 4010 through 4013, which are executed in the disk device group 200.

In the first processing (steps 4003 through 4006), the administrator sets paths between the disk device group 200 and the storage controller blades 110 of the new blade storing unit 101B (step 4003).

To be specific, the administrator uses a cable to connect the interface unit 120 of one storage controller blade 110 to the interface unit 120 of another storage controller blade 110N or the like. Then, according to the instruction from the management terminal 500, the storage controller blade 110 sets a path. The path setting has only to be performed on one of a redundant path pair. Further, a path to the disk device group 200 does not have to be set.

Next, according to the instruction from the management terminal 500, the storage controller blade 110 uses the configuration information stored in the step 4002 to establish the configuration information on the storage controller blade 110 of the new blade storing unit 101B (step 4004).

To be specific, the storage controller blade 110 of the new blade storing unit 101B is caused to recognize the configuration of the RAID array, and imports a logical volume. Further, a path to the host computer 300A is set. Accordingly, the storage controller blade 110 of the new blade storing unit 101B recognizes the disk device group 200 and the host computer 300A, and allows the processing by the storage controller 100.

Then, the interface units 120 of the storage controller blades 110 stored in the new blade storing unit 101B are connected with the network 400 by use of cables (step 4005). In other words, the path management program of the host computer 300A is operated to switch a blade to be accessed by the host computer 300A from the storage controller blade 110 of the old blade storing unit 101A over to the storage controller blade 110 of the new blade storing unit 101B. To be specific, a destination (including a physical address of a target and a port number of a SAN switch) to be accessed by the host along the path is switched over.

Then, according to the instruction from the management terminal 500, the host computer 300A causes the storage controller blade 110 to switch an access path from the host computer 300A over to the storage controller blade 110 of the new blade storing unit 101B (step 4006). In other words, the path management program of the host computer 300A is operated to switch a blade to be accessed by the host computer 300A from the storage controller blade 110 of the old blade storing unit 101A over to the storage controller blade 110 of the new blade storing unit 101B. To be specific, a destination (including a physical address of a target and a port number of a SAN switch) to be accessed by the host along the path is switched over.

In the second processing (steps 4010 through 4013), according to the instruction from the management terminal 500, a new disk device group 200 added to the existing disk device group 200 is initialized (step 4010).

Then, according to the instruction from the management terminal 500, the data stored in the existing disk device group 200 is copied to the newly added disk device group 200 (step 4011).

To be specific, according to the instruction from the management terminal 500, data is copied between a logical volume allocated in the newly added disk device group 200 and the logical volume allocated in the existing disk device group 200. A copy function such as mirroring may be used for the data copy.

Then, the management terminal 500 judges whether or not the copy is complete (step 4012). When judged that the copy is complete, a program stored in the host computer 300A is operated to set an access path from the host computer 300A to the newly added disk device group 200 (step 4013). To be specific, path management software or the like stored in the host computer 300A is used to switch a path from the host computer 300A.

After the first and second processings both end, the frozen configuration information is released (step 4007). This allows the processing by the storage controller blade 110 of the new blade storing unit 101B.

The above-mentioned processing makes it possible to change the configuration of the storage controller 100.

It should be noted that based on the configuration information stored in the step 4002, all the storage controller blades 110 stored in the old blade storing unit 101A and the new blade storing unit 101B may be initialized so that one storage controller 100 is set to include the storage controller blades 110 of the old and new storage controller blades. This allows, for example, the new blade storing unit 101B and the old blade storing unit 101A to be set as one storage controller 100 while being located physically apart from each other.

In the third embodiment, the configuration information is directly copied between the storage controller blades 110. This can eliminate the need for the storage area for the configuration information on the logical volume described above in the first embodiment and the non-volatile storage device unit 600 described above in the second embodiment.

As described above, according to the third embodiment of this invention, it is possible to change (enhance) the configuration of the storage controller blades 110 during the operation of the storage controller 100. At the same time, the configuration of the disk device group 200 can be changed (enhanced). In particular, the storage system can be changed into a redundant structure with ease.

The method of changing the configuration of the storage controller 100 has been described above according to the first to third embodiments. The feature of this invention resides in that the storage controller blade 110 of the old blade storing unit 101A can be relocated to the new blade storing unit 101B without any changes in the storage controller blade 110 itself, which allows the use thereof.

Fourth Embodiment

Next, description will be made of a fourth embodiment of this invention.

Shown in the fourth embodiment is how pieces of information are distributed in the memories provided to the respective storage controller blades 110 and the switch connection blades in the storage system of the first through third embodiments described above.

Figure 14:
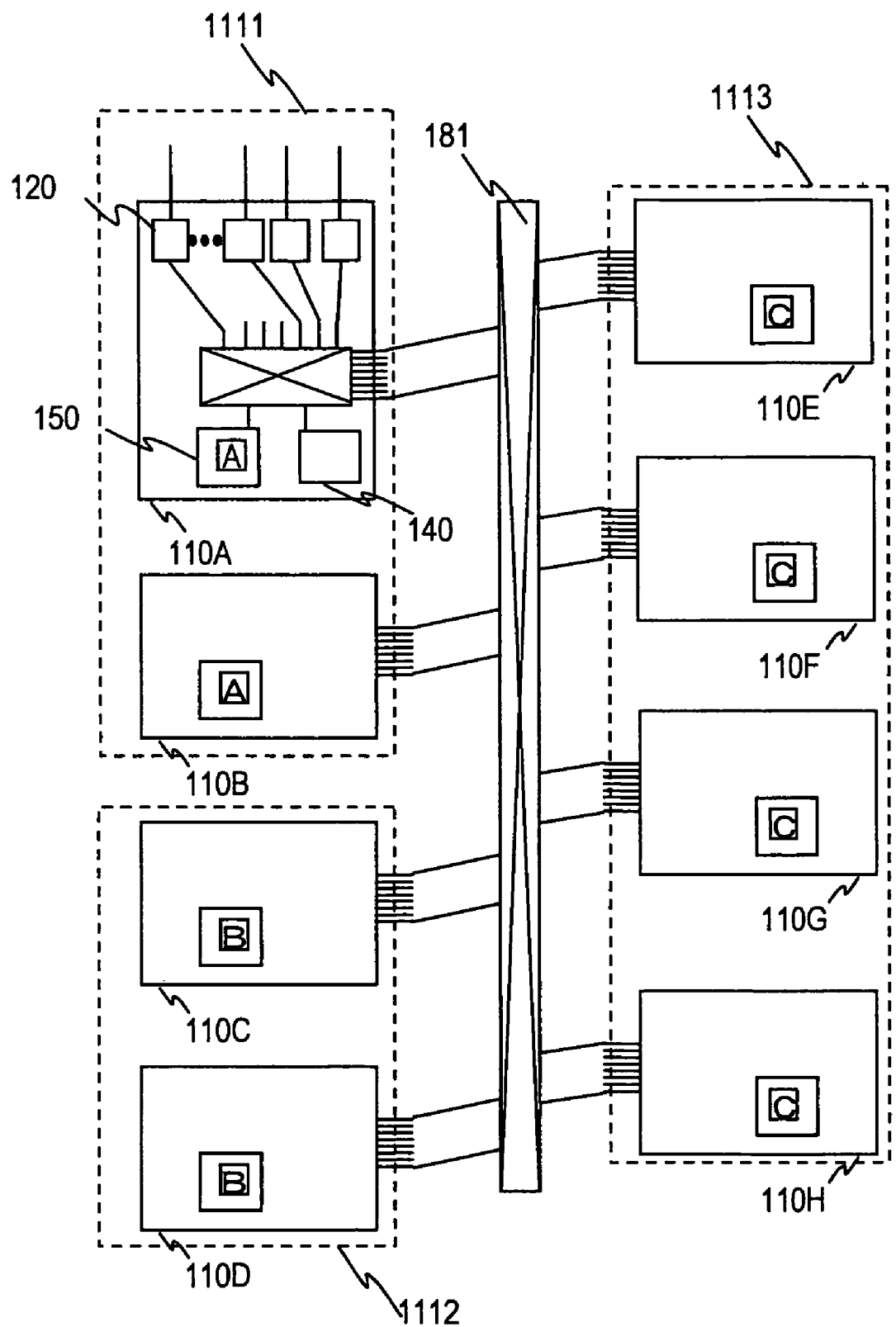
FIG. 14 is a block diagram showing a configuration of a storage controller according to a fourth embodiment.

FIG. 14 is a block diagram showing a configuration of the storage controller 100 according to the fourth embodiment, and shows how to distribute pieces of information to be redundantly stored within the storage controller 100.

The storage controller 100 according to the fourth embodiment has a full-mesh configuration composed of eight storage controller blades 110A through 110H. In other words, the eight storage controller blades 110 are each directly connected to all the other storage controller blades 110.

The information to be redundantly stored within the storage controller includes the storage controller configuration information, control information, and data input/output control information (for example, directory management information on cached data). Hereinafter, the information is called "management information".

In the fourth embodiment, the management information is redundantly stored in at least two storage controller blades within the storage controller 100. To be specific, a plurality of a redundant-storage groups 1111 through 1113 are set, and the management information is redundantly stored in each redundant-storage group.

In the redundant-storage group 1111 shown in the example of FIG. 14, a management information piece A is stored in each of the memory units 150 provided to the storage controller blades 110A and 110B. Also, in the redundant-storage group 1112, a management information piece B is stored in each of the memory units 150 provided to the storage controller blades 110C and 110D. Further, in the redundant-storage group 1113, a management information piece C is stored in each of the memory units 150 provided to the storage controller blades 110E through 110H.

The management information pieces are thus stored redundantly, thereby enhancing the availability of the storage system.

It should be noted that every storage controller blade belongs to one redundant-storage group in the example of FIG. 14, but the storage controller blade may belong to two or more redundant-storage groups.

Here is an example configuration where the same management information piece is redundantly stored in all the storage controller blades. In this configuration, even when a failure occurs in all the storage controller blades but one, the management information on the entire system can be maintained, which maximizes its availability. However, the large capacity needs to be ensured in the memory unit for storing redundant information.

Figure 15:
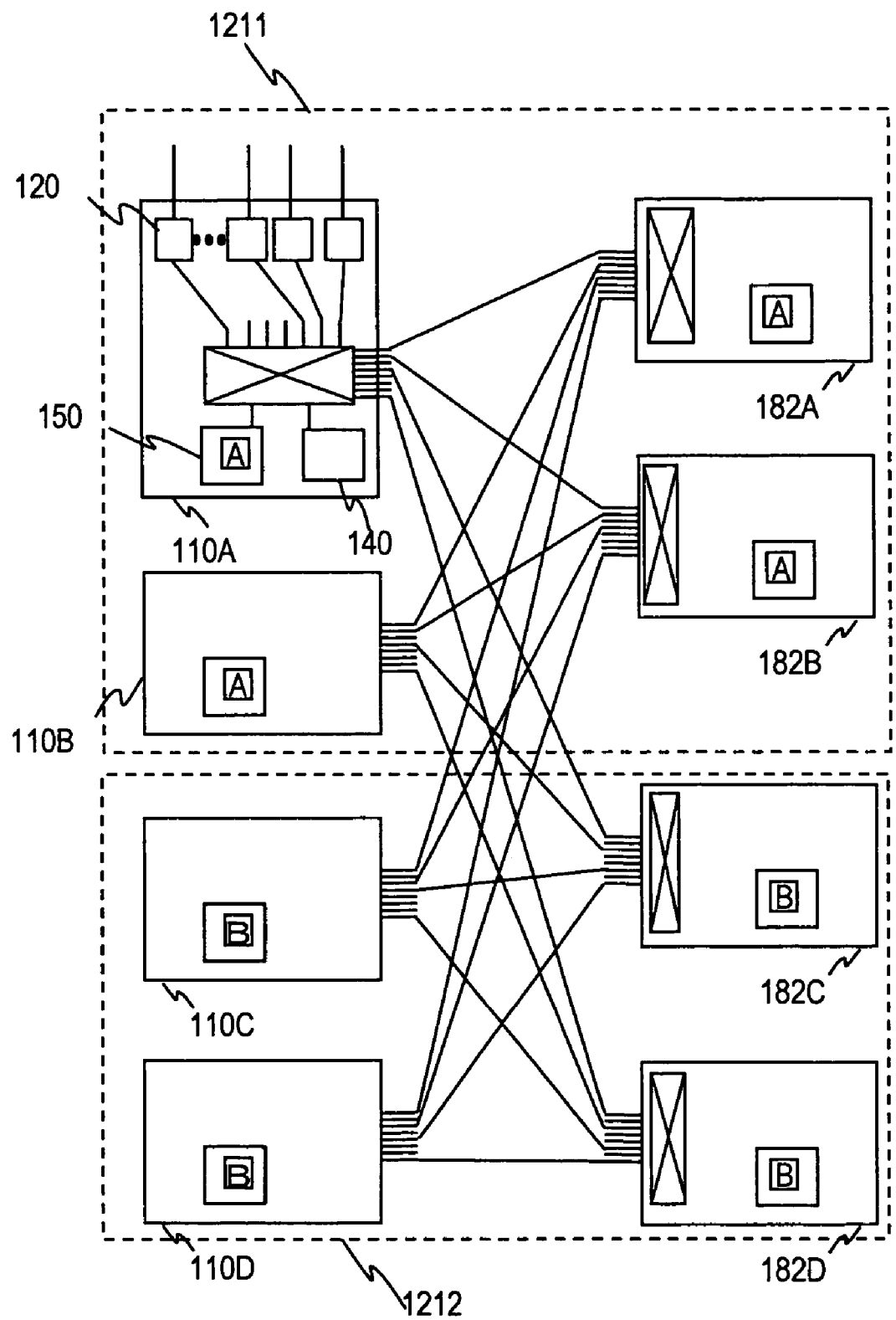
FIG. 15 is a block diagram showing a configuration of the storage controller according to a modified example of the fourth embodiment.

FIG. 15 is a block diagram showing a configuration of the storage controller 100 according to a modified example of the fourth embodiment, and shows how to distribute pieces of information to be redundantly stored within the storage controller 100.

In the example of FIG. 14, the storage controller blades form a full-mesh configuration, but the storage controller 100 shown in FIG. 15 includes the storage controller blades 110A through 110D and switch connection blades with a memory unit 182A to 182D.

In the large-scale system configuration using a switch connection blade with a memory unit, the memory mounted to the switch connection blade is used for the redundant-storage group.

In other words, the management information piece is redundantly stored in the memories provided to the respective storage controller blades and the switch connection blades. To be specific, a plurality of redundant-storage groups 1211 and 1212 are set, and the management information is stored in each redundant-storage group.

In the redundant-storage group 1211 shown in the modified example of FIG. 15, the management information piece A is stored in each of the memory units 150 provided to the storage controller blades 110A and 110B and the memory units provided to the switch connection blades 182A and 182B. Also, in the redundant-storage group 1212, the management information piece B is stored in each of the memory units 150 provided to the storage controller blades 110C and 110D and the memory units provided to the switch connection blades 182C and 182D.

It should be noted that every pair of the storage controller blade and the switch connection blade belong to one redundant-storage group in the modified example of FIG. 15, but the storage controller blade may belong to two or more redundant-storage groups. Alternatively, the storage controller blade and the switch connection blade do not necessarily form a pair.

For example, when the management information is redundantly stored only in the switch connection blades, the capacity can be reduced in the memory unit 150 of the storage controller blade.

It should be noted that each distribution method for the management information has characteristics, and any distribution is effective for improving the availability of the system.

As in the example shown in FIG. 14 or the modified example shown in FIG. 15 as described above, in the storage controller 100, it is possible to enhance the availability of the storage controller 100 by dividing redundant information into several groups and redundantly storing the information in the memory units 150 of the storage controller blades and the memory units of the switch connection blades.

Next, description will be made of processing performed when a failure occurs in the storage controller 100 that redundantly stores the management information as described above. To be specific, description will be made of a method of controlling the configuration of the redundant-storage groups when a failure occurs in the storage controller blade 110 and in the case where the storage controller blade 110 is replaced.

Figure 16:
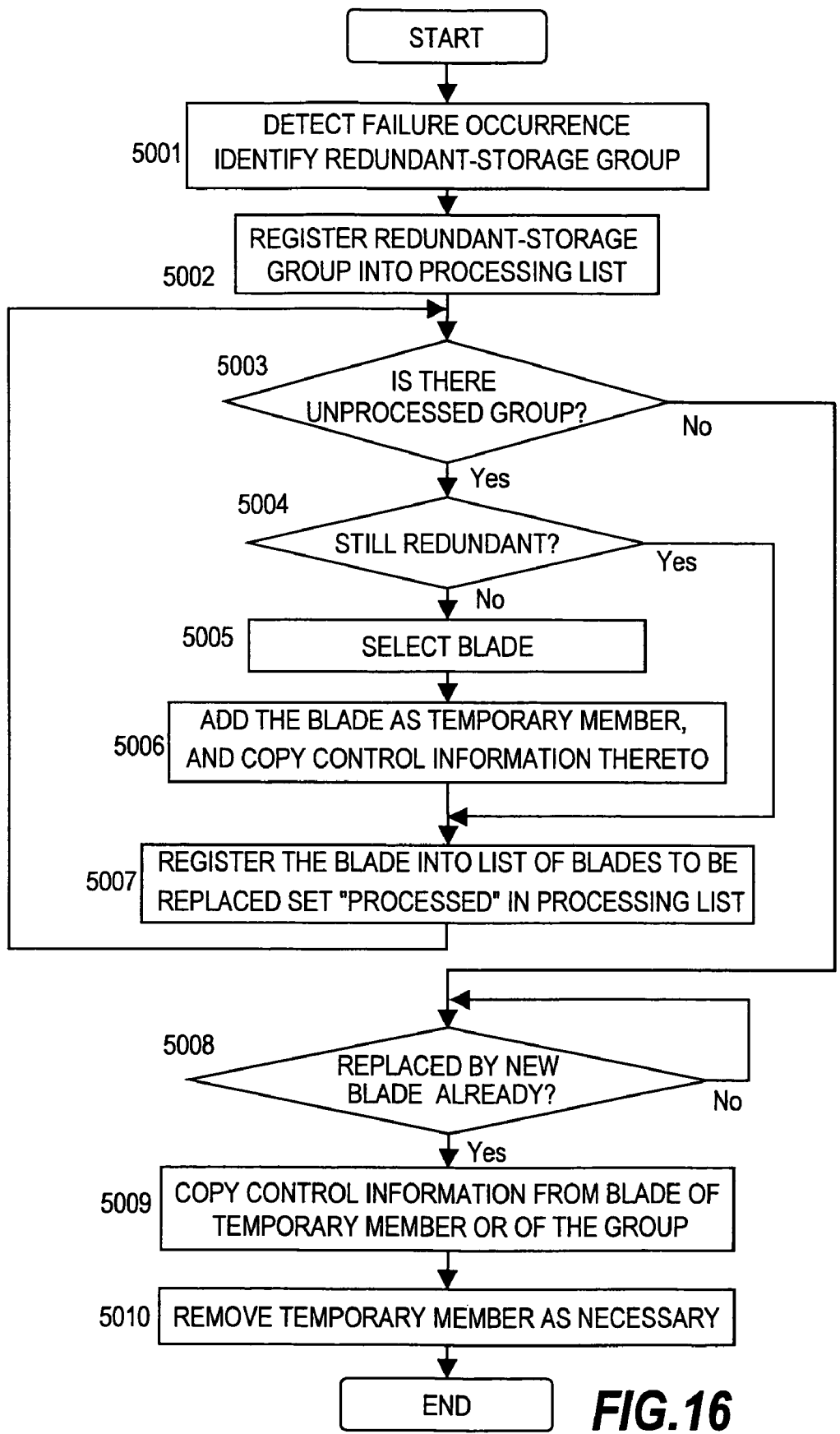
FIG. 16 is a flowchart of processing of handling a failure occurring in the storage controller according to the fourth embodiment.

FIG. 16 is a flowchart of processing of handling a failure occurring in the storage controller 100.

The processing is executed when a failure occurs in the storage controller blade 110A or the like provided to the storage controller 100.

The processing is executed mainly by the processor unit 140 of another storage controller blade that belongs to the same redundant-storage group and is not experiencing the failure. Alternatively, the processing may be executed by the processor unit 140 of one storage controller blade as the entire storage controller 100.

First, when it is detected that a failure has occurred in any one of the storage controller blades, the redundant-storage group to which the storage controller blade belongs is identified. When the storage controller blade experiencing the failure belongs to a plurality of redundant-storage groups, all the redundant-storage groups to which the storage controller blade belongs are identified (step 5001).

Then, the identified redundant-storage group is registered into a processing list (step 5002). The processing list is stored in the memory unit 150 of the storage controller blade including the processor unit 140 that is executing the processing. With reference to the processing list, the following processing is executed.

Then, the processing list is referenced, and it is judged whether or not there is any unprocessed redundant-storage group (5003).

When it is judged that there is an unprocessed redundant-storage group left, the procedure advances to a step 5004. When it is judged that there is no unprocessed redundant-storage group left, the procedure advances to a step 5008.

In the step 5004, it is judged whether or not the selected redundant-storage group is still redundant. In other words, it is judged whether or not the same management information piece is stored in all the storage controller blades 110 belonging to the redundant-storage group but the one that is experiencing a failure.

When it is judged that the selected redundant-storage group is no more redundant, the redundancy of the management information previously stored redundantly has been lost due to a failure. In this case, the availability of the storage system degrades. Therefore, another storage controller blade needs to be used to immediately ensure the redundancy, so the procedure advances to a step 5005. On the other hand, when it is judged that the selected redundant-storage group is still redundant, it is unnecessary to immediately ensure the redundancy, so the procedure advances to a step 5007.

In the step 5005, one or more storage controller blades are selected from the storage controller blades that are not experiencing a failure.

Then, the selected storage controller blade is added as a temporary member of the redundant-storage group. After that, the management information stored in the redundant-storage group is copied to the memory unit 150 of the storage controller blade added as the temporary member (step 5006).

Then, the selected storage controller blade 110 is registered into a list of blades to be replaced. Also, a flag indicating "processed" is set for the redundant-storage group in the processing list (step 5007). After that, the procedure returns to the step 5003, and when it is judged that there is an unprocessed redundant-storage group left, the processing of the steps 5004 through 5007 is repeated.

In the step 5008, it is judged whether or not the storage controller blade in which a failure occurred has already been replaced. When it is judged that the storage controller blade 110 in which a failure occurred has already been replaced, the procedure advances to a step 5009.

In the step 5009, when it is judged that there is a storage controller blade added as a temporary member of the redundant-storage group, the management information stored therein is copied to the memory unit 150 of the storage controller blade 110 that has replaced the old one. On the other hand, when it is judged that there is no storage controller blade added as a temporary member of the redundant-storage group, in other words, when there is a redundancy left, the management information is copied from any one of the storage controller blades belonging to the redundant-storage group.

Then, as necessary, the storage controller blade added as a temporary member of the redundant-storage group is removed from the redundant-storage group (step 5010).

It should be noted that when a plurality of storage controller blades are replaced, the switch connection blade of the steps 5009 and 5010 is repeated by a necessary number of times.

Then, the processing upon the occurrence of a failure comes to an end.

It should be noted that the flowchart of FIG. 16 describes the case of the storage controller blade, but the same processing upon the occurrence of a failure can be performed on the storage controller blade with a memory unit.

As described above, according to the fourth embodiment of this invention, the management information is redundantly stored in a plurality of storage controller blades and switch connection blades. Further, the management information is stored in each redundant-storage group. With such an arrangement, the availability of the storage controller 100 enhances.

Fifth Embodiment

Next, description will be made of a fifth embodiment of this invention.

Shown in the fifth embodiment is how a plurality of switch connection blades 182 are configured in the storage systems of the first through fourth embodiments described above.

In the first through fourth embodiments described above, the storage controller blades 110 form a full-mesh configuration in a small-scale system. On the other hand, a large-scale system is formed by use of the switch connection blade 182.

In this embodiment, description will be made of an example change in the connection configuration of the switch connection blade 182 in the case of a larger-scale system.

Figure 17:
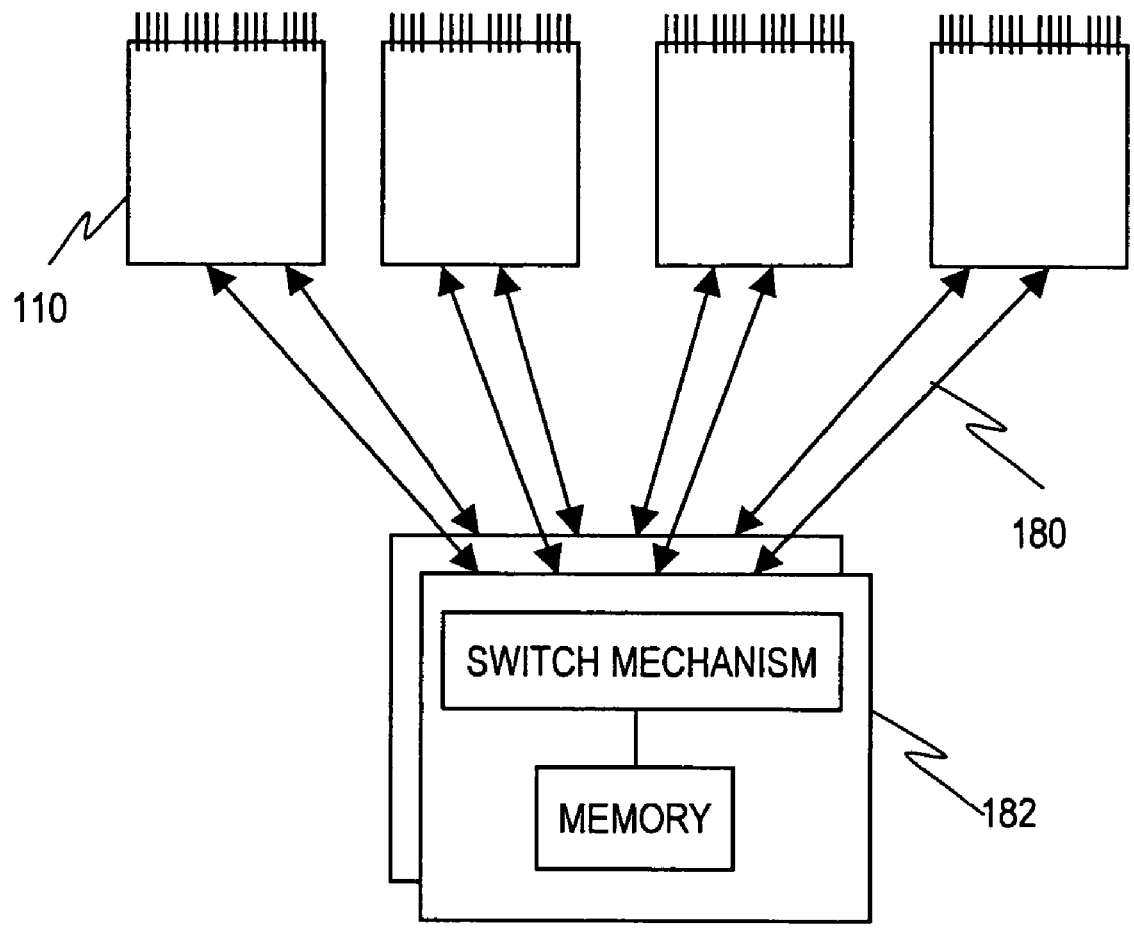
FIG. 17 is a block diagram showing a configuration of a storage controller configured into a small scale according to a fifth embodiment.

FIG. 17 is a block diagram showing the configuration of the storage controller 100 configured into a small scale.

The storage system shown in FIG. 17 includes four storage controller blades 110 and two switch connection blades 182.

The storage controller blades 110 are substantially the same as those described above in FIG. 2. The memory unit 150 of the storage controller blade 110 does not necessarily need to be used as a cache or a shared memory storing management information, but the memory unit 150 of the switch connection blade 182 with a memory unit may be used as a shared memory.

It should be noted that the storage controller blades 110 are connected to the switch connection blades 182 via the mutual network system 180.

Herein, consideration is given to the case where the configuration of the storage controller 100 shown in FIG. 17 is scaled up into a large scale.

Figure 18:
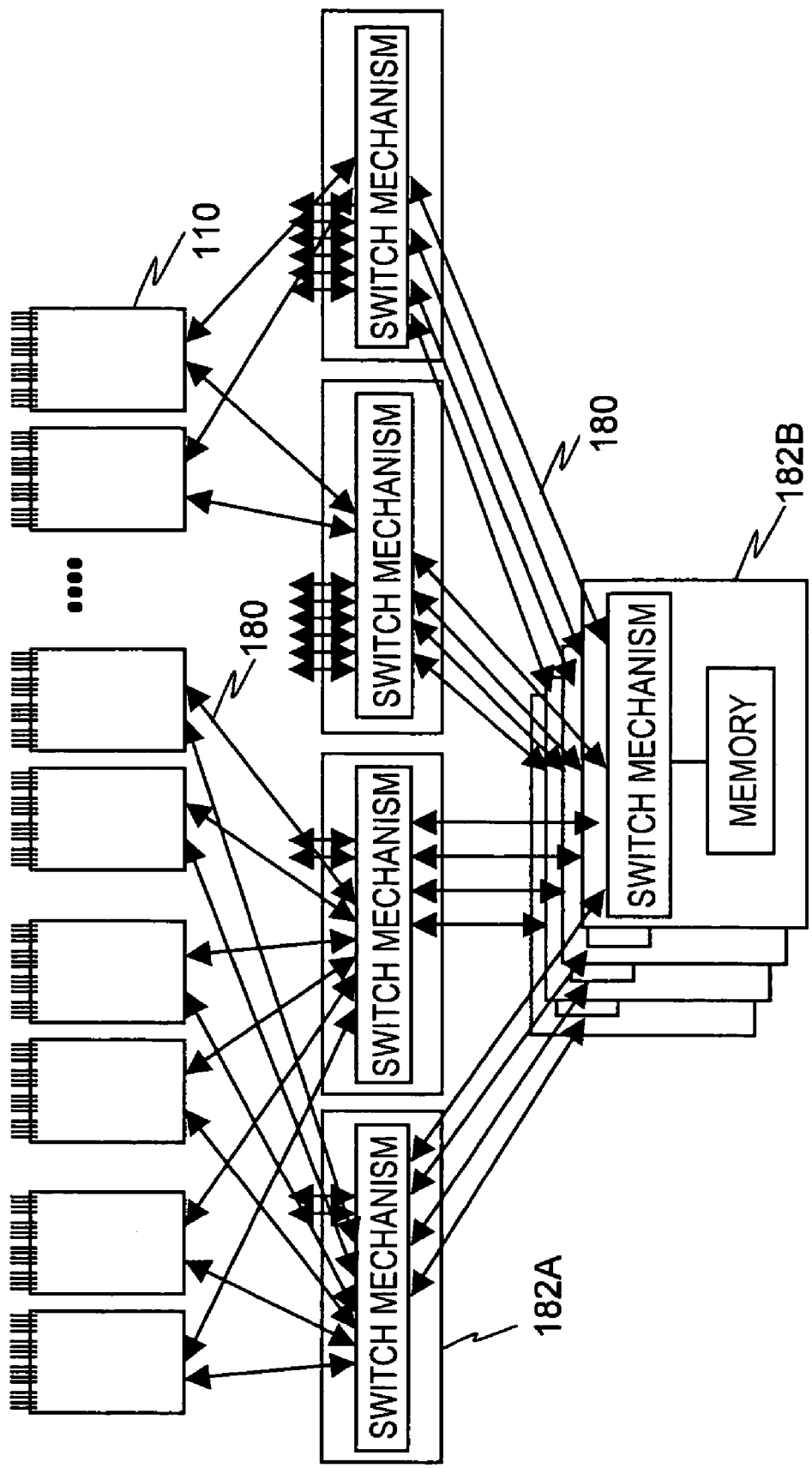
FIG. 18 is a block diagram showing a configuration of the storage controller configured into a large scale according to the fifth embodiment.

FIG. 18 is a block diagram showing the configuration of the storage controller 100 configured into a large scale. The storage controller shown in FIG. 18 is added with more storage controller blades 110 in addition to the configuration shown in FIG. 17. The storage controller blades 110 are connected to one another by the switch connection blades 182A. In addition, the switch connection blades 182A are connected to one another by other switch connection blades 182B.

The connection is made between the switch connection blades 182A and 182B in multiple stages. In other words, one stage of mutual connection by use of the switch connection blades 182 is used in a small-scale system, and in a large-scale system, a change is made into multiple stages of mutual connection by use of the switch connection blades 182A and 182B.

As described above, according to the fifth embodiment, even when more storage controller blades 110 having the same configuration are connected for implementing the large-scale system configuration, the number of paths connecting the blades can be reduced. Therefore, it becomes easier to switch from a small-scale system configuration into a large-scale system configuration, so the initial cost can be suppressed to a lower level.

It should be noted that also in this embodiment, the methods of the first through third embodiments can be used for the procedure of changing a configuration.

While the present invention has been described in detail and pictorially in the accompanying drawings, the present invention is not limited to such detail but covers various obvious modifications and equivalent arrangements, which fall within the purview of the appended claims.

What is claimed is:

1. A storage controller for controlling data access made from a host computer to a disk device, comprising:
   a plurality of storage controlling units which control data access to at least one of a plurality of disk devices;
   a non-volatile storage unit which is accessible by each of the storage controlling units; and
   a mutual network system that connects the storage controlling units to one another,
   wherein each of said storage controlling unit comprises:
   a processor unit that controls a configuration of the storage controller and data access to at least one of said disk devices,
   interface units that are connected to the host computer and the disk devices,
   a memory unit that stores a data cache and configuration information of the storage controlling unit, and
   a mutual connection unit that connects the interface units, the processor unit, and the memory unit to one another,
   wherein the processor unit recognizes a form of connection of the storage controlling unit to another storage controlling unit over the mutual network system,
   wherein the configuration information of the storage controlling unit before changing is stored in the non-volatile storage unit,
   wherein when a configuration of the storage controller is to be changed by replacing the storage controlling unit with a new storage controlling unit, changes to the configuration information are inhibited,
   wherein the storage controlling unit stores the configuration information, which is stored in the non-volatile storage unit, in a dedicated area allocated in the disk devices,
   wherein configuration information is obtained from said dedicated area allocated in the disk devices and stored in the non-volatile storage unit,
   wherein, according to an instruction from a management terminal, an access path from the host computer to the storage controlling unit is switched from the storage controlling unit to said new storage controlling unit, thereby causing the access path to be from the host computer to said new storage controlling unit,
   wherein the configuration of said new storage controlling unit, which has been changed, is established based on the configuration information obtained from said dedicated area allocated in the disk devices and stored in the non-volatile storage unit, and
   wherein the configuration information includes information on a storage controller configuration, control information, data input/output control information, a RAID structure of a disk device group, a logical volume structure, and a function set for the logical volume structure.

2. The storage controller according to claim 1, wherein the mutual network system connects the storage controlling units to one another on a one-to-one basis, or
   wherein the mutual network system comprises a switch that transfers data sent/received between the storage controlling units, and uses the switch to connect the storage controlling units to one another.

3. The storage controller according to claim 1, further comprising:
   a plurality of mutual network systems;
   wherein at least one of the mutual network systems contains a shared memory unit, and wherein the shared memory unit stores the data cache, configuration information of the interface unit, and configuration information of the processor unit.

4. The storage controller according to claim 1, wherein in a case where a configuration of the storage controller is changed, the configuration information of the storage controlling unit before changing is set to be inhibited of change, which is stored in the memory,
   wherein after the configuration of the storage controller is changed, the configuration of the new storage controlling unit is established based on the configuration information, and
   wherein then, the configuration information stored in the memory is allowed to be changed.

5. The storage controller according to claim 1, wherein the configuration information comprises information of a configuration of a logical volume allocated in the disk device.

6. The storage controller according to claim 1, wherein the configuration information comprises information of a configuration of a logical volume allocated in the disk device and information of a status of a function set in the disk device.

7. The storage controller according to claim 1, wherein control information to be shared for improving reliability, which is included in the configuration information, is redundantly stored in the memory unit of each of at least two storage controlling units; and
   wherein the at least two storage controlling units forms a redundant group.

8. The storage controller according to claim 7, wherein when a failure occurs in one of the storage controlling units that redundantly store the control information, the processor unit adds to the redundant group another storage controlling unit that does not belong to the redundant group, and ensures redundancy of the control information by copying the control information to the memory unit of the storage controlling unit added.

9. The storage controller according to claim 1, wherein the storage controlling unit further comprises:
   a discovery unit for recognizing information on another storage controlling unit, and
   wherein the discovery unit establishes a link with the another storage controlling unit which is connected to the storage controlling unit, obtains information on kind of the another storage controlling unit and an identifier of a port connected to the storage controlling unit which is included in the another storage controlling unit, and stores the obtained information as discovery information.

10. The storage controller according to claim 9, wherein the discovery information includes a unit identifier for identifying a type of a device connected to the storage controlling unit, a slot identifier for identifying a location of the device in the mutual network system, a port identifier for identifying a port of the device connected to the storage controlling unit, function information representing a function of the device, a memory capacity amount representing a memory capacity of a memory unit in the device, and own-connection port identifier for identifying a port of the storage controlling unit to which the device is connected.

11. The storage controller according to claim 9, wherein the storage controlling unit creates routing management information after obtaining the information, and
   wherein the routing management information includes destination information representing a function of a device to be accessed, a slot identifier for identifying a location in which the device to be accessed is inserted, an own-connection port identifier for identifying a port of the storage controlling unit connected to the device to be accessed, an incoming port identifier for identifying a port of the device connected between the device to be accessed and the storage controlling unit, a relay part identifier for identifying a device connected between the device to be accessed and the storage controlling unit, an outgoing port identifier for identifying a port of the device connected between the device to be accessed and the storage controlling unit, and a source port identifier for identifying a port of the device to be accessed which is connected to the device connected between the device to be accessed and the storage controlling unit.

12. The storage controller according to claim 1, wherein the storage controlling unit switches a blade to be accessed by the host computer from the storage controlling unit over to the new storage controlling unit.

13. The storage controller according to claim 1, wherein the storage controlling unit writes, into the disk device, data stored in the cache memory but not reflected on the disk device.

14. A computer system, comprising:
   a host computer on which an application program operates;
   a disk device that stores data used by the host computer;
   a storage controller that controls data access from the host computer to the disk device; and
   a management terminal that manages management information on the computer system,
   wherein the storage controller comprises:
   a plurality of storage controlling units which control data access to said disk device,
   a non-volatile storage unit which is accessible by each of the storage controlling units; and
   a mutual network system that connects the plurality of storage controlling units to one another,
   wherein each storage controlling unit comprises:
   a processor unit that controls a configuration of the storage controller and the data access,
   interface units that are connected to the host computer and the disk device,
   a memory unit that stores a data cache and configuration information of the storage controlling unit, and
   a mutual connection unit that connects the interface units, the processor unit, and the memory unit to one another,
   wherein the processor unit recognizes a form of connection of the storage controlling unit to another storage controlling unit over the mutual network system, when a change is made to one of a form of connection to the storage controlling unit and a form of connection to the mutual network system,
   wherein the configuration information of the storage controlling unit before changing is stored in the non-volatile storage unit,
   wherein when a configuration of the storage controller is to be changed by replacing the storage controlling unit with a new storage controlling unit, changes to the configuration information are inhibited,
   wherein the storage controlling unit stores the configuration information, which is stored in the non-volatile storage unit, in a dedicated area allocated in the disk devices,
   wherein configuration information is obtained from said dedicated area allocated in the disk devices and stored in the non-volatile storage unit,
   wherein, according to an instruction from said management terminal, an access path from the host computer to the storage controlling unit is switched from the storage controlling unit to said new storage controlling unit, thereby causing the access path to be from the host computer to said new storage controlling unit, wherein the configuration of the new storage controlling unit, which has been changed, is established based on the configuration information obtained from said dedicated area allocated in the disk devices and stored in the non-volatile storage unit, and wherein the configuration information includes information on a storage controller configuration, control information data input/output control information, a RAID structure of a disk device group, a logical volume structure, and a function set for the logical volume structure.

* * * * *